United States Patent
Asano et al.

(10) Patent No.: US 7,471,690 B2
(45) Date of Patent: Dec. 30, 2008

(54) PACKET TRANSFER DEVICE, SEMICONDUCTOR DEVICE AND PACKET TRANSFER SYSTEM

(75) Inventors: Kazuya Asano, Kawasaki (JP);
Teruhiko Nagatomo, Kawasaki (JP);
Tomokazu Aoki, Kawasaki (JP);
Junichi Hashida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1456 days.

(21) Appl. No.: 09/962,118

(22) Filed: Sep. 26, 2001

(65) Prior Publication Data
US 2002/0176426 A1 Nov. 28, 2002

(30) Foreign Application Priority Data
May 17, 2001 (JP) ............................. 2001-147324

(51) Int. Cl.
*H04L 12/28* (2006.01)
*H04J 3/16* (2006.01)
*H04I 9/00* (2006.01)

(52) U.S. Cl. .................. 370/401; 370/395.42; 370/466; 713/154; 709/243

(58) Field of Classification Search ............... 370/229, 370/235, 351, 389, 392, 395.2, 395.21, 395.3, 370/395.31, 395.32, 395.42, 395.5, 461, 370/465, 466, 401; 709/229, 219, 239, 243, 709/220, 225; 713/154, 155, 160, 161, 168
See application file for complete search history.

(56) References Cited

U.S. PATENT DOCUMENTS

| | | | |
|---|---|---|---|
| 6,529,897 B1 * | 3/2003 | Corl et al. ..................... 707/2 |
| 6,647,427 B1 * | 11/2003 | Watanabe .................. 709/239 |
| 6,772,347 B1 * | 8/2004 | Xie et al. ...................... 726/11 |

OTHER PUBLICATIONS

"5 Steps for Understanding Basics of Firewall," Network, 2001, pp. 74-85.
"VPN Using the Internet Like a Leased Line," Nikkei Byte, 2000, pp. 116-127.
Japanese Office Action for Application No. JP 2001-147324 dated May 23, 2006.

* cited by examiner

Primary Examiner—A. Qureshi
(74) Attorney, Agent, or Firm—Staas & Halsey LLP

(57) ABSTRACT

There are provided a packet transfer device, a semiconductor device, and a packet transfer system, which can provide a DMZ constructed in a simple configuration. A LAN is connected to a first port. A public server is connected to a second port. A WAN is connected to a third port. A filtering section performs filtering processing according to attributes of each packet inputted via any one of the first to third ports. A routing section carries out routing processing on the packet which was not discarded by the filtering section.

22 Claims, 36 Drawing Sheets

| DESTINATION PORT NUMBER | | | | | PACKET LENGTH |
|---|---|---|---|---|---|
| 4 | 3 | 2 | 1 | 0 | |
| 0 | 0 | 1 | 1 | 1 | Length(Byte) |

FIG. 11

| PROTOCOL TYPE | INPUT PORT | DESTINATION PORT | PASSAGE/ NON-PASSAGE |
|---|---|---|---|
| 0x0806(ARP) | 0 | 1, 2, 5 | 1 |
| 0x0806(ARP) | 1 | 0, 2, 5 | 1 |
| 0x0806(ARP) | 2 | 0, 1, 5 | 1 |
| 0x0806(ARP) | 3 | 5 | 1 |
| 0x0806(ARP) | 4 | 5 | 0 |
| 0x0806(ARP) | 5 | 4 | 0 |
| 0x0806(ARP) | 5 | 0, 1, 2, 3 | 1 |
| 0x0800(IP) | 0 | 1, 2, 5 | 1 |
| 0x0800(IP) | 1 | 0, 2, 5 | 1 |
| 0x0800(IP) | 2 | 0, 1, 5 | 1 |
| 0x0800(IP) | 3 | 5 | 1 |
| 0x0800(IP) | 4 | 5 | 1 |
| 0x0800(IP) | 5 | 4 | 1 |
| 0x0800(IP) | 5 | 0, 1, 2, 3 | 1 |

FIG. 12

| ICMP TYPE (DECIMAL REPRESENTATION) | INPUT PORT NUMBER | DESTINATION PORT NUMBER | PASSAGE/ NON-PASSAGE |
|---|---|---|---|
| 17 | 4 | 5 | 1 |
| 18 | 5 | 4 | 1 |

FIG. 13

| ID VALUE (ENTRY NUMBER) | IP ADDRESS |
|---|---|
| 0 | IP OF PUBLIC SERVER |
| 1 | IP OF LAN CLIENT |
| ⋮ | ⋮ |

FIG. 14

| CONNECTION NUMBER (ENTRY NUMBER) | IP ADDRESS (ID VALUE) | | VALIDITY/INVALIDITY | | PASSAGE/ NON-PASSAGE |
|---|---|---|---|---|---|
| | SOURCE | DESTINATION | SOURCE | DESTINATION | |
| 0 | x | 0 | 0 | 1 | 1 |
| 1 | 0 | x | 1 | 0 | 1 |
| 2 | 0 | 1 | 1 | 1 | 1 |
| 3 | 1 | x | 1 | 0 | 1 |
| 4 | x | 1 | 0 | 1 | 1 |
| ⋮ | ⋮ | ⋮ | ⋮ | ⋮ | ⋮ |

FIG. 15

| ENTRY NUMBER | L3 NUMBER | TCP/ UDP | SOURCE PORT NUMBER | DESTI- NATION PORT NUMBER | ACK | VALIDITY/INVALIDITY | | | | | WAN INPUT | PASSAGE/ NON-PASSAGE |
|---|---|---|---|---|---|---|---|---|---|---|---|---|
| | | | | | | L3 | T/U | SOURCE | DESTI- NATION | ACK | | |
| 0 | 0 | 1 | × | 80 | × | 1 | 1 | 0 | 1 | 0 | 0 | 1 |
| 1 | 1 | 1 | 80 | × | × | 1 | 1 | 1 | 0 | 0 | 0 | 1 |
| 2 | 2 | 1 | × | × | 0 | 1 | 1 | 0 | 0 | 1 | 0 | 0 |
| 3 | 3 | 1 | × | 80 | × | 1 | 1 | 0 | 1 | 0 | 0 | 1 |
| 4 | 4 | 1 | 80 | × | 1 | 1 | 1 | 1 | 0 | 1 | 1 | 1 |
| 5 | 4 | 1 | × | × | 0 | 1 | 1 | 0 | 0 | 1 | 1 | 0 |
| ... | ... | ... | ... | ... | ... | ... | ... | ... | ... | ... | ... | ... |

FIG. 16

PACKET TRANSFER DEVICE, SEMICONDUCTOR DEVICE AND PACKET TRANSFER SYSTEM

BACKGROUND OF THE INVENTION

1. Field of the Invention

This invention relates to a packet transfer device, a semiconductor device and a packet transfer system, and more particularly to a packet transfer device for transferring packets between LANs, public servers and WANs, a semiconductor device included in the packet transfer device, and a packet transfer system.

2. Description of the Related Art

Recently, Internet services providing constant connections to the Internet, such as ISDN (Integrated Service Digital Network), ADSL (Asymmetric Digital Subscriber Line), and FTTH (Fiber To The Home), have become available to home users and SOHO (Small Office Home Office) users. Accordingly, there is an increasing demand of users for installing a public server in such an environment constantly connected to the Internet, for making various kinds of information open to the public.

Further, there is conventionally known a method in which a DMZ (DeMilitarized Zone) as a segment isolated by firewalls is provided for protection of a public server against unauthenticated access or malicious attacks from the Internet, and the public server is installed in the DMZ.

FIG. 36 shows an example of a conventional method of constructing a DMZ.

In FIG. 36, a public server 22 is connected to a LAN (Local Area Network) 20 via a firewall 21, and at the same time connected to a WAN (Wide Area Network) 24 via a firewall 23.

According to this construction, unauthenticated access to the public server 22 from the WAN 24 can be blocked by the firewall 23, while unauthenticated access to the public server 22 from the LAN 20 and indirect unauthenticated access to the LAN 20 performed by taking over the public server 22 can be blocked by the firewall 21.

Therefore, by using the DMZ, it is possible to prevent not only unauthenticated access to the public server 22, but also unauthenticated access to the LAN 20 from the WAN 24, which is attempted by taking over the public server 22.

However, the construction of the DMZ mentioned above requires expensive and sophisticated firewalls, which makes it difficult to introduce this method e.g. into average homes or SOHOs, both in terms of costs and techniques.

SUMMARY OF THE INVENTION

It is an object of the invention to provide a packet transfer device, a semiconductor device and a packet transfer system, which make it possible to realize an inexpensive and compact DMZ with ease.

To attain the above object, according to a first aspect of the invention, there is provided a packet transfer device for transferring packets. This packet transfer device is characterized by comprising a first port for connection to a LAN, a second port for connection to a public server, a third port for connection to a WAN, filtering means for performing filtering processing according to attributes of each packet inputted via any one of the first to third ports, and routing means for carrying out routing processing on the packet which was not discarded by the filtering means.

To attain the above object, according to a second aspect of the invention, there is provided a semiconductor device included in a packet transfer device for transferring packets. This semiconductor device is characterized by comprising a first port for connection to a LAN, a second port for connection to a public server, a third port for connection to a WAN, filtering means for performing filtering processing according to attributes of each packet inputted via any one of the first to third ports, and routing means for carrying out routing processing on the packet which was not discarded by the filtering means.

To attain the above object, according to a third aspect of the invention, there is provided a packet transfer system including a LAN, a public server, a WAN, and a packet transfer device for transferring packets between the LAN, the public server, and the WAN. This packet transfer system is characterized in that the packet transfer device comprises a first port for connection to the LAN, a second port for connection to the public server, a third port for connection to the WAN, filtering means for performing filtering processing according to attributes of each packet inputted via any one of the first to third ports, and routing means for carrying out routing processing on the packet which was not discarded by the filtering means.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 11 is a diagram showing an example of a format of a transfer instruction descriptor;

FIG. 12 is a diagram showing an example of a network layer protocol type table;

FIG. 13 is a diagram showing an example of an ICMP table;

FIG. 14 is a diagram showing an example of an IP address registration table;

FIG. 15 is a diagram showing an example of an L3 table;

FIG. 16 is a diagram showing an example of an L4 table;

FIGS. 32(A) and 32(B) are diagrams showing differences between an ordinary IP packet and a VPN packet, in which:

FIG. 32(A) shows the ordinary IP packet; and

FIG. 32(B) shows the VPN packet;

DESCRIPTION OF THE PREFERRED EMBODIMENT

A preferred embodiment of the present invention will now be described below with reference to accompanying drawings.

Figure 1:
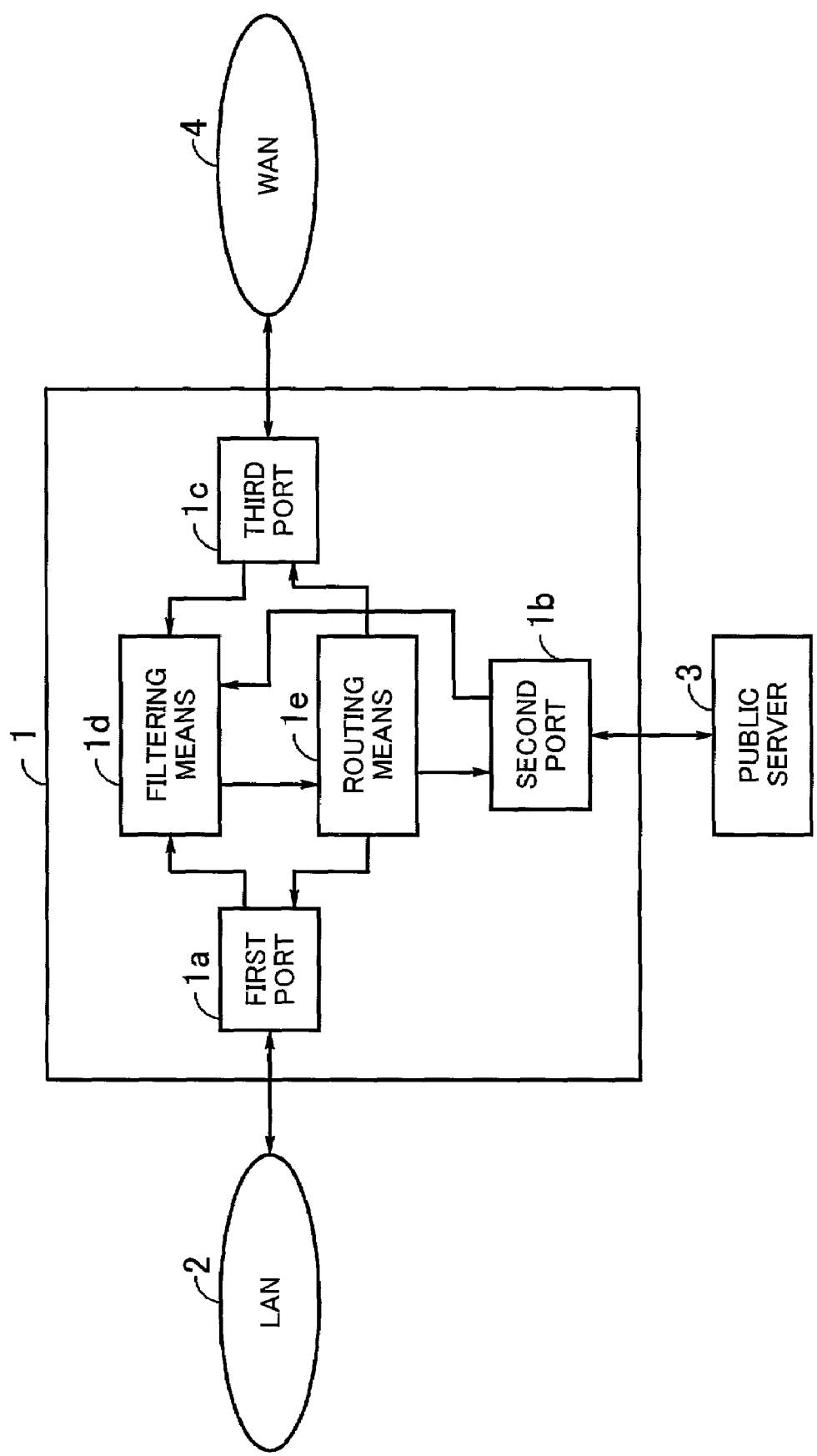
FIG. 1 is a block diagram useful in explaining operating principles of a packet transfer system according to the present invention.

FIG. 1 is a diagram useful in explaining the operating principles of a packet transfer system according to the invention, which is comprised of a packet transfer device 1, a LAN 2, a public server 3 and a WAN 4.

The packet transfer device 1 is comprised of a first port 1a, a second port 1b, a third port 1c, filtering means 1d and routing means 1e.

The first port 1a is an interface for use in exchanging packets between the packet transfer device 1 and the LAN 2.

The second port 1b is an interface for use in exchanging packets between the packet transfer device 1 and the public server 3.

The third port 1c is an interface for use in exchanging packets between the packet transfer device 1 and the WAN 4.

The filtering means 1d performs filtering according to the attribute of a packet inputted via any one of the ports 1a to 1c.

The routing means 1e performs routing processing on a packet which was not discarded by the filtering means 1d.

The LAN 2 is a small network installed e.g. in a home or a SOHO, and has one or more nodes (such as personal computers) connected thereto.

The WAN 4 is a large network such as the Internet, and has numerous nodes (such as public servers) and other networks connected thereto.

Next, the basic operation of the system in FIG. 1 will be described.

First, description will be given of operation performed when a connection request is sent from a predetermined node connected to the WAN 4 to the public server 3.

When a packet requesting connection is transmitted from the predetermined node on the WAN 4 to the public server 3, the packet is inputted to the packet transfer device 1 via the third port 1c.

The filtering means 1d within the packet transfer device 1 detects, with reference to header information of the packet and the port via which the packet was inputted, that the packet is directed to the public server 3 from the predetermined node on the WAN 4, for a connection request. Since connection requests to the public server 3 via the WAN 4 are permitted, the filtering means 1d passes the packet therethrough to the routing means 1e.

The routing means 1e delivers the packet supplied from the filtering means 1d to the public server 3 via the second port 1b.

The public server 3 receives the packet, and e.g. when the packet requests transmission of predetermined information, acquires the information and packetizes the same. Then, the public server 3 adds the address of the node on the requesting side to the header of the packetized information and sends back the packet.

The packet sent back from the public server 3 is supplied to the filtering means 1d again via the second port 1b. Transmission from the public server 3 to the WAN 4 is permitted, and hence the filtering means 1d allows the packet to pass therethrough to be supplied to the routing means 1e.

When receiving the packet, the routing means 1e performs routing processing and then sends the packet to the node on the requesting side. Thus, the predetermined node connected to the WAN 4 is allowed to access the public server 3 and obtain the desired information.

Next, description will be given of a case where a connection request is outputted from a predetermined node connected to the WAN 4 to a predetermined node connected to the LAN 2.

When a packet requesting connection is transmitted from the predetermined node on the WAN 4 to the predetermined node on the LAN 2, the packet is inputted to the packet transfer device 1 via the third port 1c.

The filtering means 1d within the packet transfer device 1 detects, with reference to header information of the packet and the port via which the packet was inputted, that the packet is directed to the predetermined node on the LAN 2 from the predetermined node on the WAN 4, for a connection request. Connection requests from the WAN 4 to the LAN 2 are often made by malicious users, and it is desirable that such accesses are blocked, so that the filtering means 1d discards the present packet.

Thus, unauthenticated access from the WAN 4 to the LAN 2 can be blocked.

Next, description will be given of operation of the system which is performed after a predetermined node on the WAN 4 has taken over the public server 3 to access the LAN 2 therefrom by using the public server 3 as a beachhead.

A packet transmitted from the public server 3 is inputted to the packet transfer device 1 via the second port 1b. Since this packet is directed to a predetermined node on the LAN 2 for a connection request, the filtering means 1d discards the present packet.

Thus, it is possible to block unauthenticated access from the invaded public server 3 to the LAN 2.

As described above, in the packet transfer system of the invention, the first to third ports 1a to 1c are arranged which are independent of each other for connection between the LAN 2, the public server 3, and the WAN 4, and when a packet transmitted from the WAN 4 to a predetermined node on the LAN 2 for a connection request is inputted, or when a packet transmitted from the public server 3 to the predetermined node on the LAN 2 for connection request is inputted, the filtering means 1d discards the packet, so that it is possible to form a DMZ with ease.

Next, the embodiment of the invention will be described.

Figure 2:
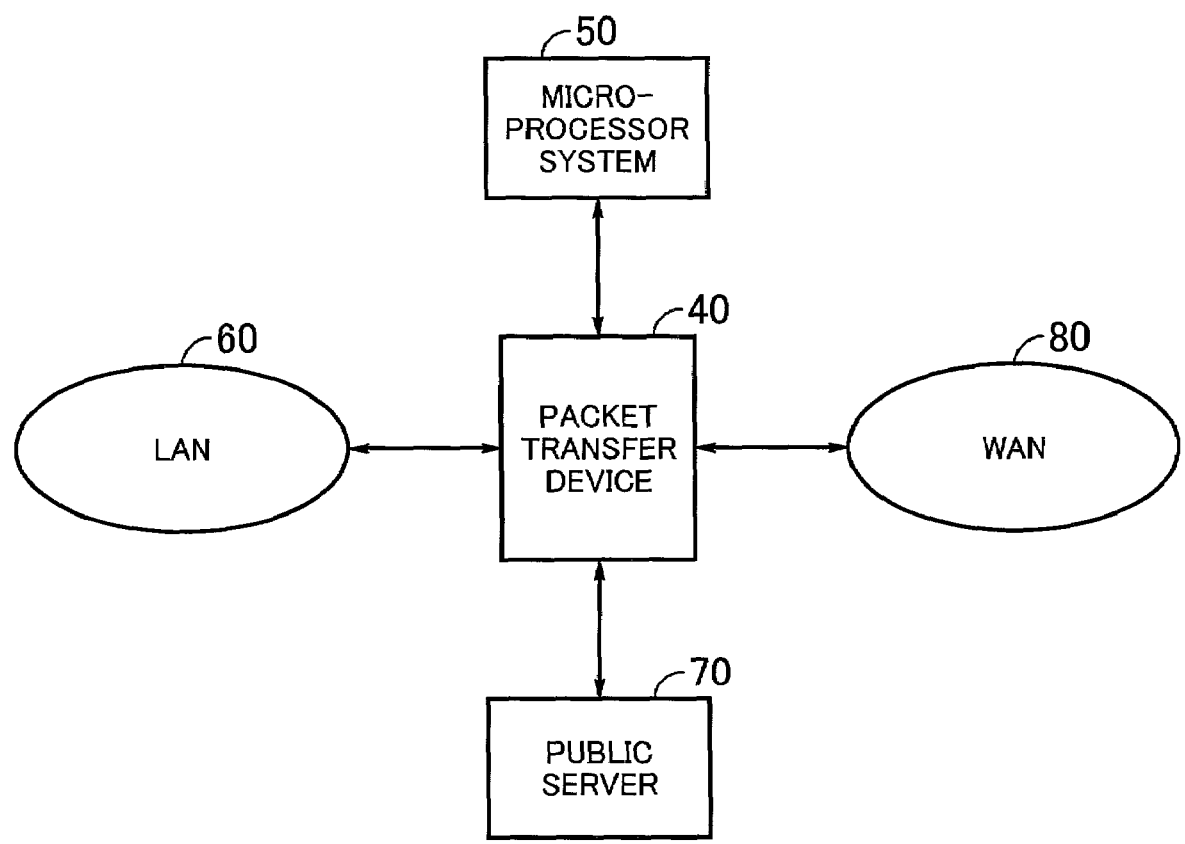
FIG. 2 is a block diagram showing an example of the arrangement of a packet transfer system according to an embodiment of the invention.

FIG. 2 shows the construction of the packet transfer system according to the embodiment. As shown in FIG. 2, the packet transfer system is comprised of a packet transfer device 40, a microprocessor system 50, a LAN 60, a public server 70 and a WAN 80.

In the present embodiment, the packet transfer device 40 transfers packets between the microprocessor system 50, the LAN 60, the WAN 80 and the public server 70 as well as discards packets as required.

The microprocessor system 50 performs routing processing and the like on packets received by the packet transfer device 40. It should be noted that although in the present embodiment, the microprocessor system 50 is provided as a part separate and independent of the packet transfer device 40, the microprocessor system 50 and the packet transfer device 40 may be combined to form a one-piece unit.

The LAN 60 is a local network constructed e.g. within a home or a SOHO, and has one or more nodes connected thereto.

The WAN 80 is a global network formed e.g. by the Internet and has numerous nodes and other networks connected thereto.

Figure 3:
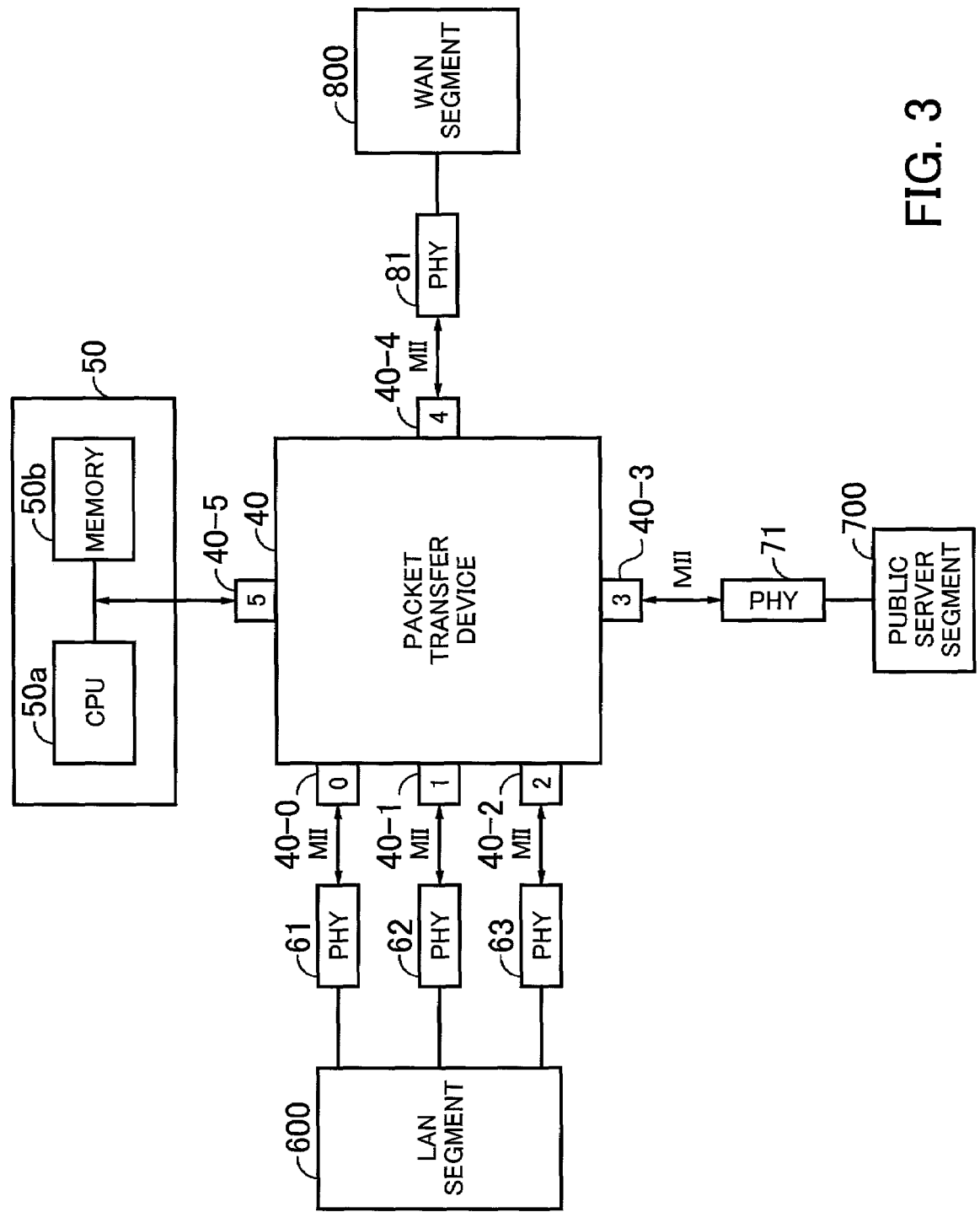
FIG. 3 is a block diagram showing an example of the arrangement of the packet transfer system which is built on an Ethernet (registered trademark of Xerox Corporation) MAC address-based switching system having a plurality of ports.

FIG. 3 shows a example of the arrangement of the packet transfer system which is built on an Ethernet (registered trademark of Xerox Corporation) MAC address-based switching system having a plurality of ports. In this example, an Ethernet switch as the core of an access router has three LAN ports 40-0 to 40-2 (hereinafter referred to as the ports #0 to #2, as required). Further, the Ethernet switching system has ports 40-3 to 40-5 (hereinafter referred to as the ports #3 to #5, as required) for connection with a public server segment 700, a WAN segment 800 and a microprocessor system 50.

A LAN segment 600 is connected to the ports 40-0 to 40-2 via respective physical layer devices 61 to 63. The public server segment 700 and the port 40-3 are interconnected via a physical layer device 71. Further, the WAN segment 800 and the port 40-4 are interconnected via a physical layer device 81.

The microprocessor system 50 is comprised of a CPU (Central Processing Unit) 50a and a memory 50b, and connected to the port 40-5.

Figure 4:
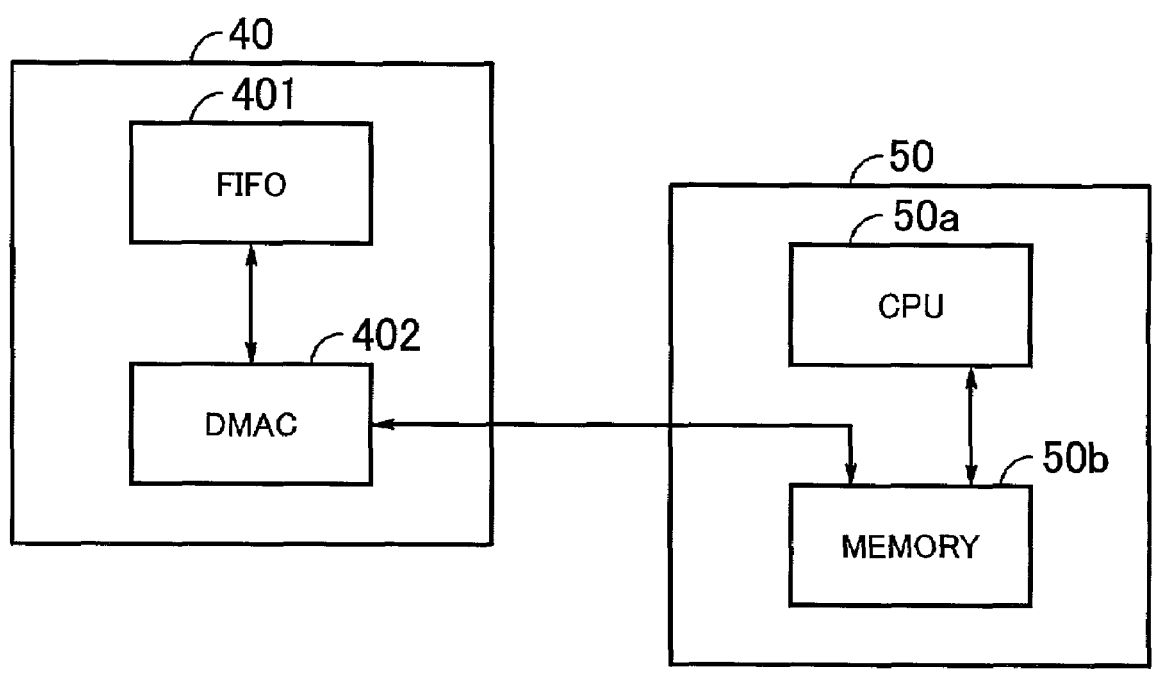
FIG. 4 is a block diagram showing another method of transferring data between a microprocessor system and a packet transfer device.

It should be noted that for data transfer between the microprocessor system 50 and the packet transfer device 40, a method shown in FIG. 4 may be employed in which a DMAC (Direct Memory Access Controller) 402 is provided in the packet transfer device 40 so as to exchange data directly between a FIFO (First In First Out) 401 and the memory 50b of the microprocessor system 50, not via the CPU 50a.

Figure 5:
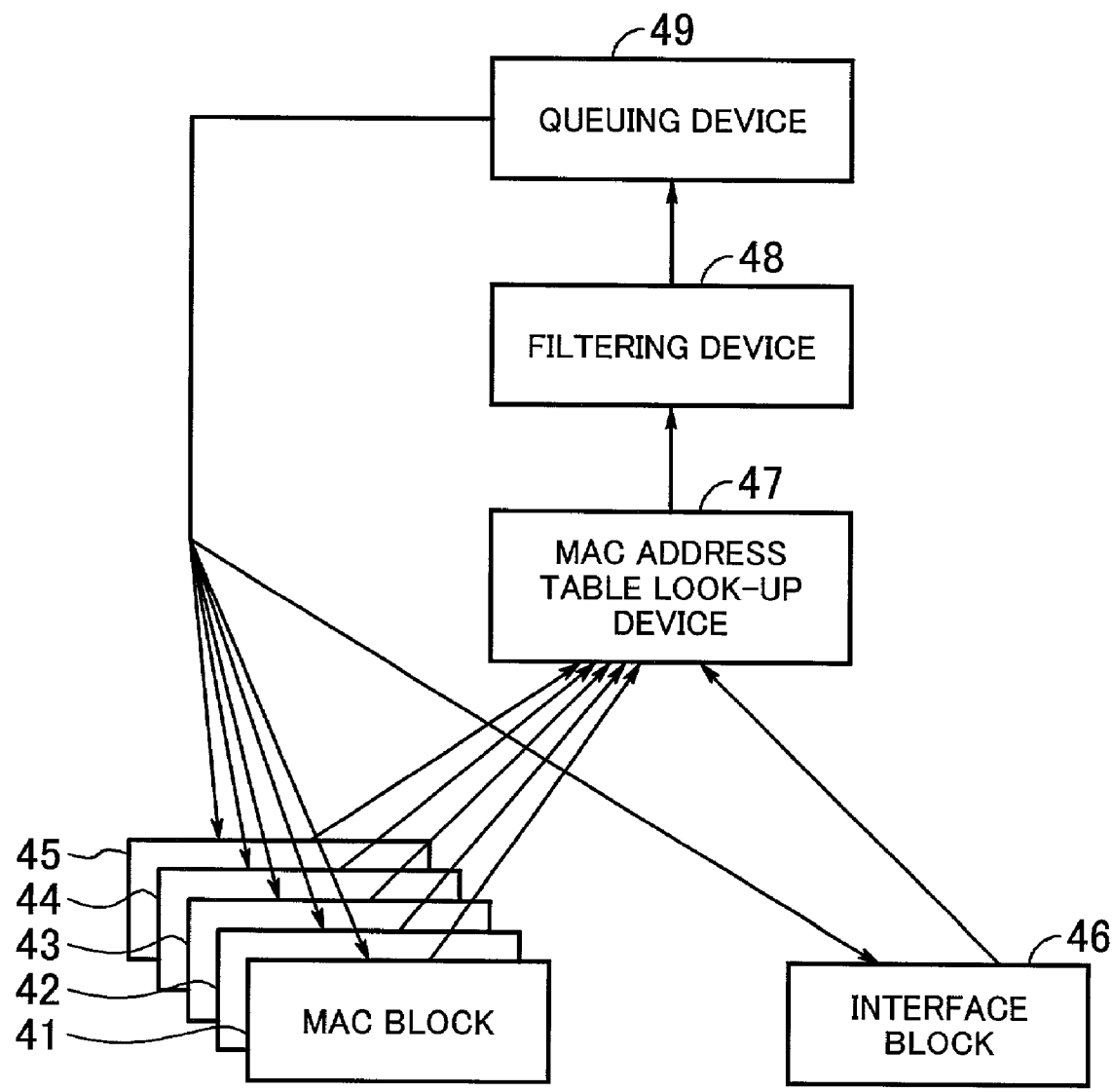
FIG. 5 is a block diagram showing details of an example of the arrangement of the packet transfer device.

FIG. 5 shows details of an example of the construction of the packet transfer device 40.

As shown in FIG. 5, the packet transfer device 40 is comprised of MAC blocks 41 to 45, an interface block 46, a MAC address table look-up device 47, a filtering device 48 and a queuing device 49.

In this example, the MAC blocks 41 to 45 correspond to the ports 40-0 to 40-4, respectively, and each delivers a packet inputted via a corresponding one of the ports, to the MAC address table look-up device 47, and receive a packet subjected to filtering processing and the like from the queuing device 49, followed by outputting the same via a corresponding one of the ports.

The interface block 46 is connected to the microprocessor system 50 via the port 40-5. The interface block 46 carries out various processing operations on packets supplied from the queuing device 49, and then deliver the same to the MAC address table look-up device 47.

The MAC address table look-up device 47 extracts a destination MAC address from each of the packets received by the MAC blocks 41 to 45 and checks the extracted MAC address against information stored in a table, to specify a destination port or output port via which the packet is to be outputted.

The filtering device 48 discards a packet delivered from the MAC address table look-up device 47, depending on predetermined conditions.

The queuing device 49 sorts packets supplied from the filtering device 48 according to the corresponding ports and then queues the same on a port-by-port basis.

Next, the parts shown in FIG. 5 will be described in detail.

First, the MAC address table look-up device 47 is explained. The MAC address table look-up device 47 has a function of looking up a MAC address table, an example of which is shown in FIG. 6, in which the MAC address of a node (e.g. a PC (Personal Computer)) connected to each port is registered in association with the port number of the port.

It should be noted that the registration method includes an automatic learning method, and a manual registering method of setting registers by manual operation.

The MAC address table look-up device 47 checks a destination MAC address acquired by a capture unit, described in detail hereinafter, included in each of the MAC blocks 41 to 45, against the corresponding destination MAC address stored in the table shown in FIG. 6 to thereby determine a destination port.

Figure 6:
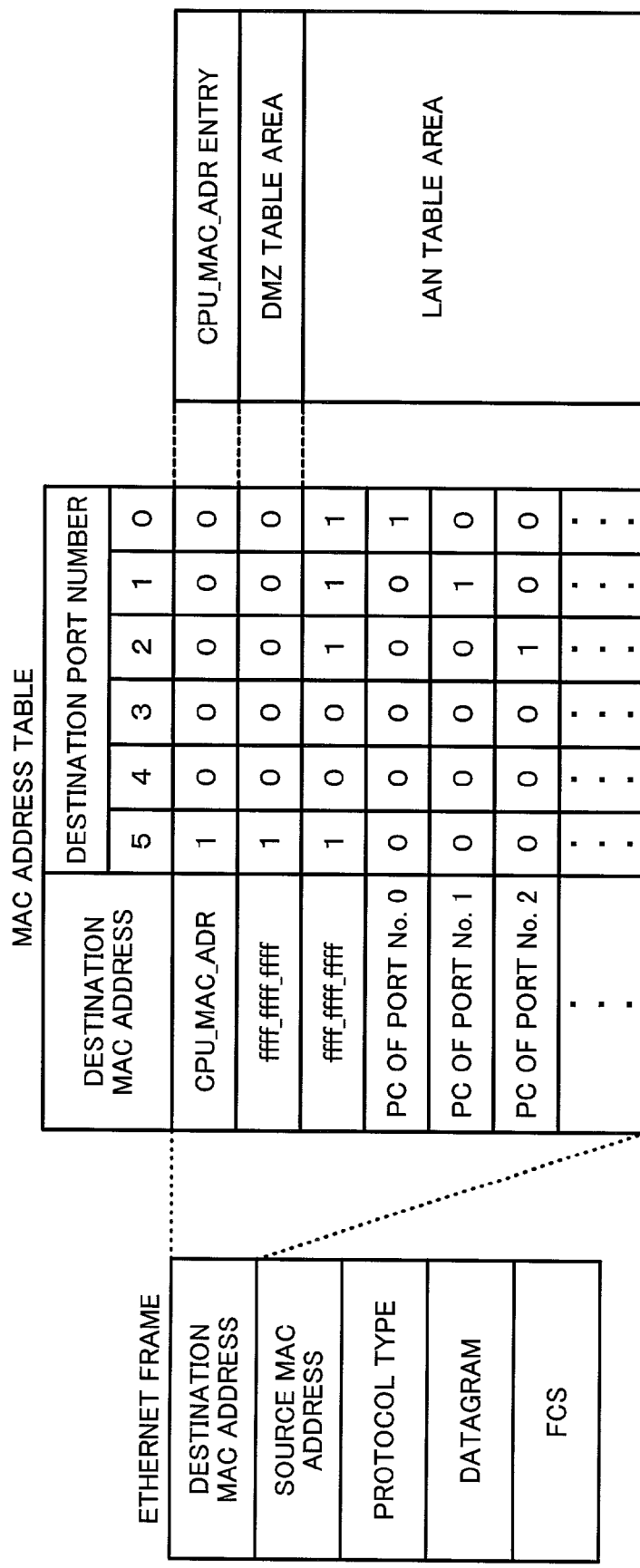
FIG. 6 is a diagram showing an example of a MAC address table.

For example, when the destination MAC address of a packet inputted e.g. via the port #0 belongs to a PC connected to the port #1, this case corresponds to the fifth item in the FIG. 6 table, and hence the packet is transferred to the port #1 having a value of "1".

This means that the port #0 and the port #1 are bridged on the link layer. In this embodiment, the ports #0 to #2 are interconnected on the link layer, and hence when a packet is inputted via any one of the ports #0 to #2, a common MAC address table area is looked up for carrying out switching on the link layer level. In the description of the present specification, the area in the MAC address table which can be commonly looked up for packets inputted via the ports #0 to #2 is hereinafter referred to as "the LAN table area".

At the head of the LAN table area, there is fixedly registered a broadcast address "ffff_ffff_ffff" correlated to the ports #0, #1, #2, #5. Therefore, a packet inputted e.g. via the port #0 and having the above broadcast address as a destination MAC address is transferred to all of the ports #0, #1, #2,

5. However, when an output port for the packet is identical to an input port, it is not required to transfer the packet to the output port, so that transfer of the packet to the port #0 is not carried out.

On the other hand, the port #3 is a port for the DMZ, and hence it is required to be separated from the LAN ports #0, #1, #2 on the link layer level. Therefore, the LAN table area is not used for looking up the destination MAC address of a packet inputted via the port #3. It should be noted that a look-up table area for packets inputted via the port #3 is hereinafter referred to as "the DMZ table area".

In the present example, there is only one DMZ port, so that the MAC address of the node connected to the port #3 is not registered. In the MAC address table, since the DMZ port comprises the port #3 alone, the broadcast address "ffff_ffff_ffff" is fixedly registered such that a packet inputted via the port #3 is transferred to the port #5. More specifically, a packet inputted via the port #3 to which is connected the public server 70 is transferred to the port #5 connected to the microprocessor system 50.

In this connection, to define a plurality of nodes as those in the DMZ, it is only required that the address of each node connected to the port #3 is registered in the DMZ table area. This enables the area can be referred to for switching between the nodes in the DMZ.

Further, the MAC address table includes an address "CPU_MAC ADR" registered in association with the port #5. The "CPU_MAC_ADR" is a MAC address assigned to the microprocessor system 50. In other words, the "CPU_MAC_ADR" is a MAC address assigned to an access router formed by the packet transfer device 40 and the microprocessor system 50.

Packets to be transferred from the LAN 60 to the WAN 80, from the LAN 60 to the public server 70 in the DMZ, from the public server 70 to the WAN 80, and from the public server 70 to the LAN 60 all needs routing by the microprocessor system 50, and hence the destination MAC addresses of the packets are set to the "CPU_MAC_ADR". The "CPU_MAC_ADR" is registered in an area which is commonly looked-up both for packets inputted via the ports #0, #1, #2 and for packets inputted via the port #3. This area is hereinafter referred to as "the CPU_MAC_ADR entry".

Further, when a packet inputted via the port #0, #1 or #2 has a destination MAC address which does not correspond to any of the broadcast address, the CPU_MAC_ADR and the addresses registered in the LAN table area, the packet is transferred to the port #5 so as to be handled by the microprocessor system 50 as a data packet having an unidentified destination.

Similarly, when a packet inputted via the port #3 has a destination MAC address which does not correspond to any of the broadcast address, the CPU_MAC_ADR and the address registered in the DMZ table area, the packet is transferred to the port #5 so as to be handled by the microprocessor system 50 as a data packet having an unidentified destination.

Further, a packet inputted via the port #5 is data from storage in the microprocessor system 50, and hence the destination port of the packet is specified by a "transfer instruction descriptor", referred to hereinafter. For this reason, MAC address look-up is not performed for the packet.

MAC address look-up is not performed, either, for any packet inputted via the port #4. More specifically, since the packets inputted via the port #4 are all from the WAN 80, they should be transferred by the microprocessor system 50.

Next, the queuing device 49 will be described.

Figure 7:
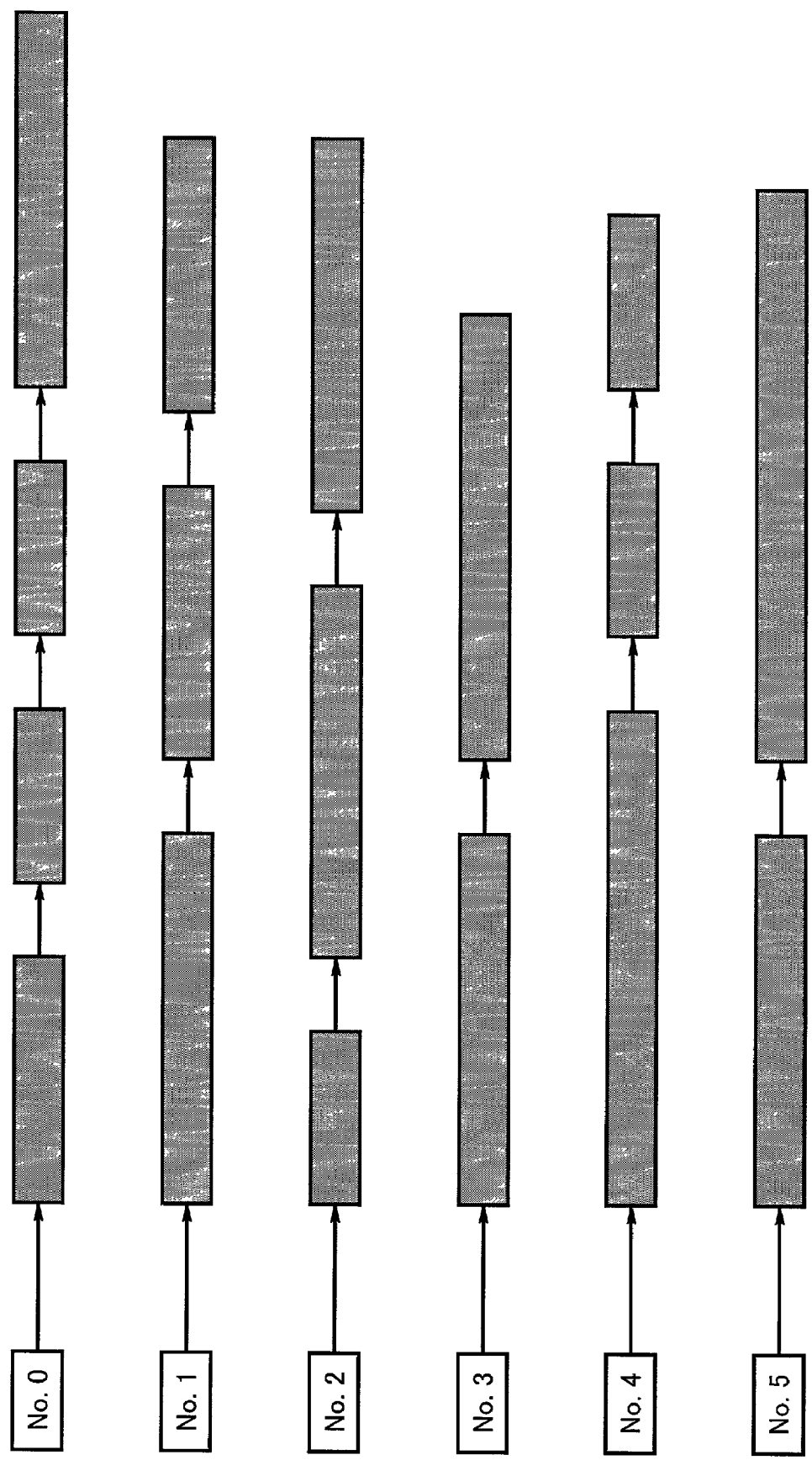
FIG. 7 is a diagram useful in explaining operation of a queuing device.

FIG. 7 is a diagram useful in explaining the queuing device 49. When the port number of a destination port of a packet is determined, the packet (filled rectangle in FIG. 7) is buffered by a link buffer of the queuing device 49, which corresponds to the port number (one of #0 to #5). Link buffers are provided in a manner corresponding to the respective ports, and in FIG. 5, the destination ports are set to the ports #0 to #5.

When multicasting is designated, an identical packet is copied to a plurality of ports and then buffered in a plurality of buffers corresponding thereto. The copying and buffering can be performed by two different methods: Simultaneously copying and buffering a packet in the plurality of buffers, and copying and buffering a packet, at timing of transfer of the packet to a destination port, in a link buffer corresponding to another destination port for the multicasting. In short, there are a simultaneous copying method and a sequential copying method. It is preferred that if a priority is given to broadcasting, the former method be selected, and if it is required to suppress depletion of the buffer capacity, the latter be selected.

Next, the interface block 46 will be described.

Figure 8:
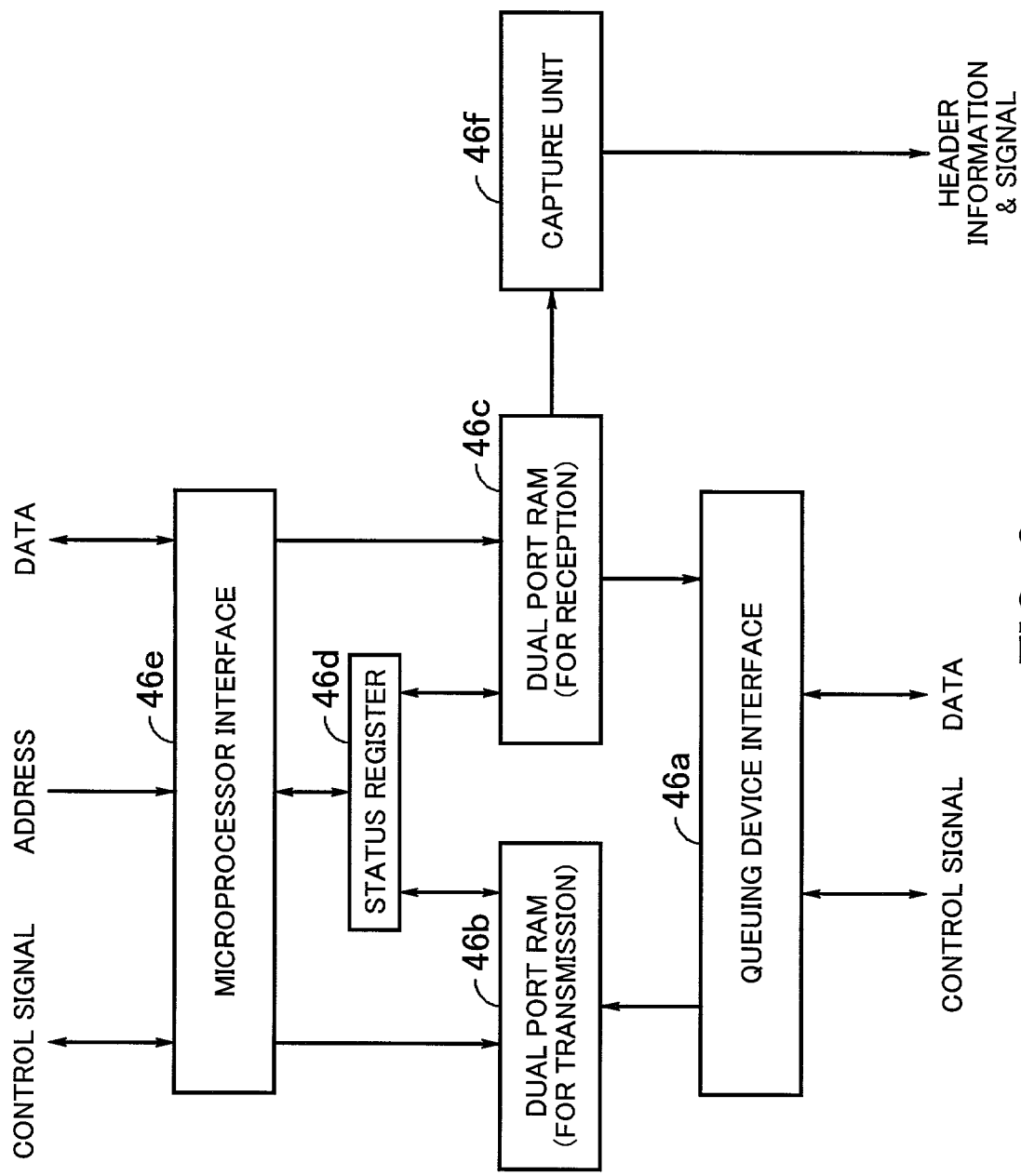
FIG. 8 is a block diagram showing details of an example of the construction of an interface block.

FIG. 8 shows an example of the construction of the interface block 46 in detail.

As shown in FIG. 8, the interface block 46 is comprised of a queuing device interface 46a, a dual port RAM (Random Access Memory) 46b, a dual port RAM 46c, a status register 46d, a microprocessor interface 46e and the capture unit 46f.

The queuing device interface 46a provides an interface with the queuing device 49 appearing in FIG. 5. The queuing device interface 46a swaps control signals and data with the queuing device 49.

The dual port RAM 46b is for transmission and functions as a buffer for use in transfer of data from the queuing device 49 to the microprocessor system 50.

The dual port RAM 46c is for reception and functions as a buffer for use in transfer of data from the microprocessor system 50 to the queuing device 49.

The status register 46d has information set therein which is indicative of statuses of the respective dual port RAM's 46b, 46c.

The microprocessor interface 46e provides an interface with the microprocessor system 50, and swaps addresses, control signals and data with the microprocessor system 50.

The capture unit 46f extracts a header from each packet stored in the dual port RAM 46c and supplies the same to the MAC address table look-up device 47.

Since the interface block 46 corresponds to the port #5, packets addressed to the port #5 among all the packets queued in the queuing device 49 are read out from the link buffers to be supplied to the interface block 46.

Each packet supplied from the queuing device 49 is stored in the dual port RAM 46b. At this time, the interface block 46 adds a header indicative of a packet length (data length) to the leading portion or head of the packet.

Then, when a certain number of packets are stored in the dual port RAM 46b, the interface block 46 notifies the microprocessor system 50 by an interrupt signal or a value of the status register 46d that data is ready for transfer.

The microprocessor system 50 accesses the dual port RAM 46b to fetch data. The total amount of data to be fetched can be determined based on the data (packet) length written in the header.

On the other hand, in the case of a packet being transferred from the microprocessor system 50 to another port (port #0, #1, #2, #3 or #4), the microprocessor system 50 stores data in the dual port RAM 46c.

In this case, the microprocessor system 50 adds a "transfer instruction descriptor" as a header to the leading portion of each packet stored in the dual port RAM 46c. The transfer instruction descriptor has a format as shown in FIG. 11 and stores the number of a destination port and a packet length.

With reference to the information set to the transfer instruction descriptor, the interface block 46 transfers the packet to a corresponding one of the link buffers in the queuing device 49.

The interface block 46 notifies the microprocessor system 50 of whether or not there is a sufficient storage area in the dual port RAM 46c, by an interrupt signal or a value of the status register 46d.

Next, the MAC blocks 41 to 45 are explained. The MAC blocks 41 to 45 are all identical in construction, so that the following description below will be given of the MAC block 41 alone.

Figure 9:
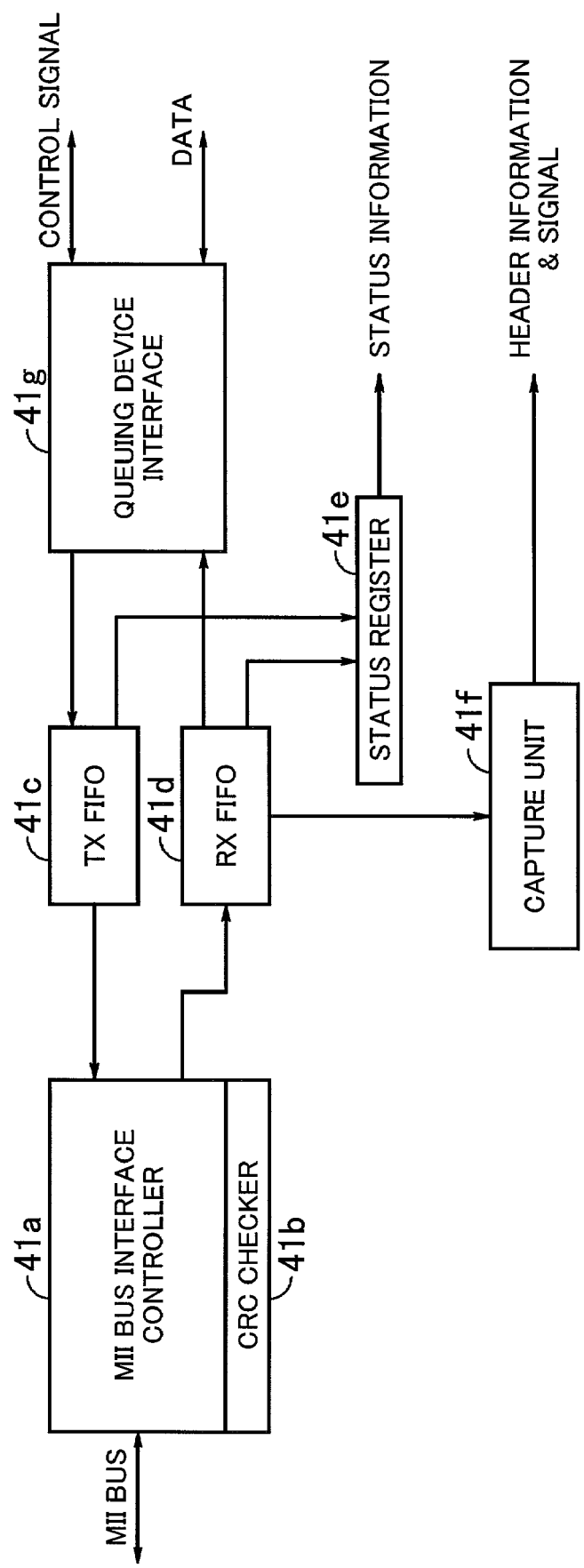
FIG. 9 is a block diagram showing details of an example of the construction of a MAC block.

As shown in FIG. 9, the MAC block 41 is comprised of an MII (Media Independent Interface) bus interface controller 41a, a CRC (Cyclic Redundancy Check) checker 41b, a TX FIFO 41c, an RX FIFO 41d, a status register 41e, a capture unit 41f and a queuing device interface 41g.

The MII bus interface controller 41a is connected to the port #0 via an MII bus. The MII bus interface controller 41a receives a packet inputted from the outside to supply the same to the RX FIFO 41d, as well as delivers a packet supplied from the TX FIFO 41c to the outside.

The CRC checker 41b compares a CRC code added to a packet for error detection, with a correct value.

The TX FIFO 41c stores packets supplied from the queuing device interface 41g, and delivers the packets to the MII bus interface controller 41a in the order in which they were stored.

The RX FIFO 41d stores packets supplied from the MII bus interface controller 41a, and delivers the packets to the queuing device interface 41g in the order in which they were stored.

The status register 41e stores information indicative of the statuses of the TX FIFO 41c and the RX FIFO 41d.

The capture unit 41f extracts header information from respective packets stored in the RX FIFO 41d and supplies the same to the MAC address table look-up device 47.

Next, the filtering device 48 is explained.

Figure 10:
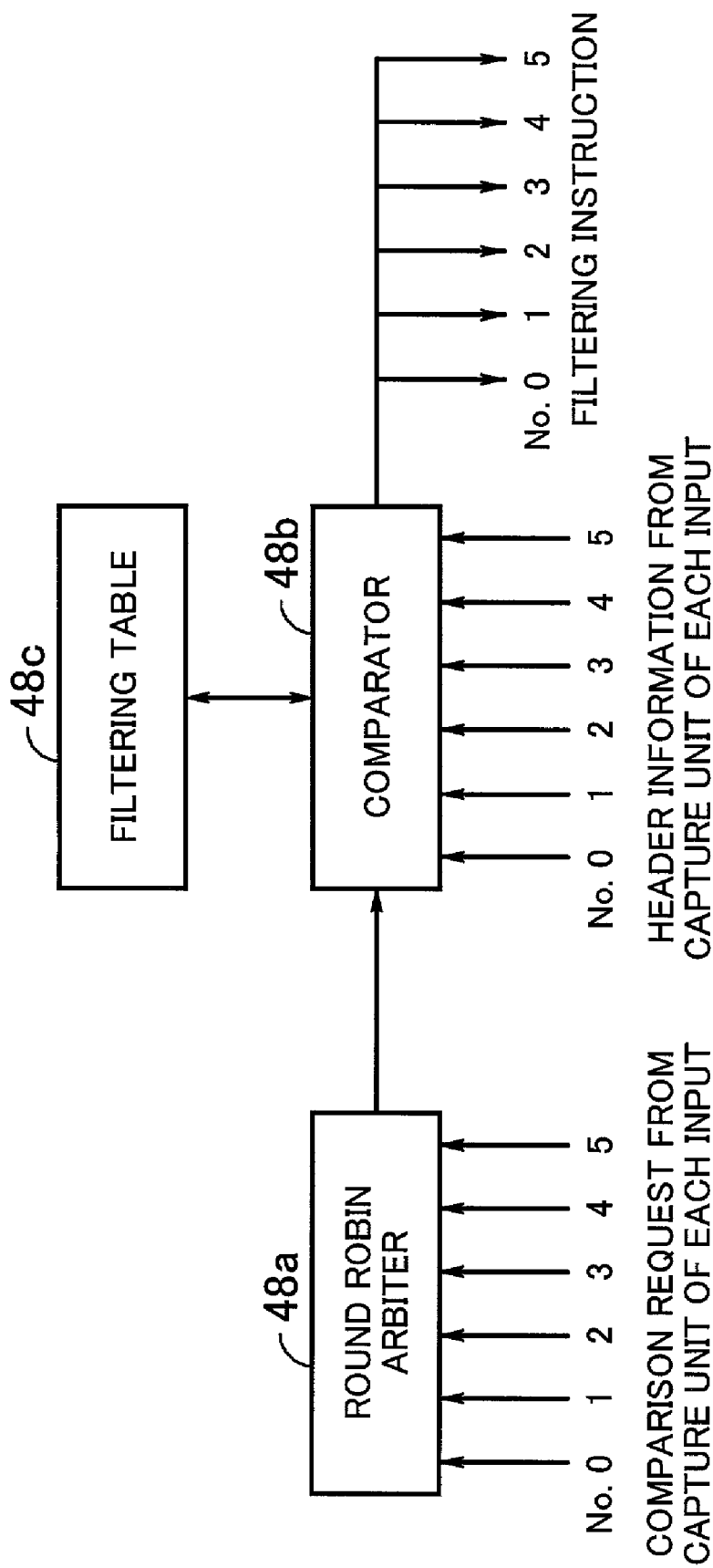
FIG. 10 is a block diagram showing details of an example of the construction of a filtering device.

FIG. 10 shows an example of the construction of the filtering device 48 in detail. As shown in FIG. 10, the filtering device 48 is comprised of a round robin arbiter 48a, a comparator 48b and a filtering table 48c.

In this example, the round robin arbiter 48a performs selection from comparison requests outputted from the capture units of the respective input ports, based on a round robin method.

The comparator 48b performs comparison between header information from a capture unit corresponding to a comparison request selected by the round robin arbiter 48a, and the filtering table 48c, and outputs information indicative of whether or not the packet should be filtered as a filtering instruction.

Header information for reference for comparison includes the following:

| | |
|---|---|
| Ethernet header | :protocol type |
| IP header | :destination IP address, source IP address, protocol |
| ICMP header | :type |
| TCP header | :destination port number, source port number, header information (control flag) |
| UDP header | :destination port number, source port number |

Next, the construction of the filtering table 48c will be described in detail.

FIG. 12 shows a network layer protocol type table. This table enables the protocol types in the Ethernet header to be looked up for execution of filtering. In this example, the table 48c stores information related to "protocol types", "input ports", "destination ports" and "passage/non-passage".

In the protocol type field is set the protocol type of the network layer. For example, the ARP (Address Resolution Protocol) protocol is set to 0×0806, while the IP protocol is set to 0×0800.

In the input port field is set each input port number.

In the destination port field is set each destination port number.

In the passage/non-passage field is set information as to whether each data packet that agrees with the contents set in the above three fields is to be permitted to pass or discarded. A value of "1" in the field indicates passage of the packet, while a value of "0" indicates discarding of the same.

In the present example, IP packets are basically permitted to pass. On the other hand, ARP packets to be transferred from the port #4 to the port #5 and ARP pockets to be transferred from the port #5 to the port #4 are discarded so as to filter off ARP packets which are to flow out into or flow in from the WAN 80.

When a packet of information concerning another network layer protocol, such as IPX, is inputted, since no protocols other than the above ones are set in the present table, the packet is handled according to an operation mode set at the time point. For instance, when the operation mode is set to an unidentified packet discarding mode, the packet is discarded, and otherwise, it is permitted to pass.

FIG. 13 shows an ICMP (Internet Control Message Protocol) table. When looked-up protocol information in the IP header of a packet is ICMP, the ICMP is checked with the ICMP table.

The ICMP protocol can be used by a cracker as a mighty tool for use in invading a network without authentication, so that it is desirable that unnecessary ICMP packets be discarded by filtering. Reference to the present table makes it possible to identify an unnecessary packet and discard the same.

In the present example, the ICMP table is comprised of information items concerning "ICMP type", "input port number", "destination port number" and "passage/non-passage".

In the ICMP type field is set a message type of ICMP.

In the input port number field is set the number of an input port via which the packet was inputted.

In the destination port number field is set the number of a destination port to which the packet is to be transferred.

In the passage/non-passage field is set information as to whether the packet is to be permitted to pass or discarded. A value of "0" in the field indicates permission of passage of the packet, while a value of "1" indicates discarding of the same.

In the illustrated example, a message packet whose ICMP type is "17" (address mask request) is prevented from flowing in from the WAN 80, and a message packet whose ICMP type is "18" (address mask response) is prevented from flowing out to the WAN 80.

FIG. 14 shows an IP address registration table.

The IP address registration table is used in registering an IP address for reference. A registered IP address is represented as an ID value by using an entry number. This makes it possible to reduce the amount of data in L3 and L4 tables, described in detail hereinbelow.

The FIG. 14 IP address registration table is comprised of two fields "ID value" and "IP address".

In the ID value field is set an ID value assigned to each IP address.

The IP address field stores IP addresses registered.

More specifically, the ID value of the IP address of the public server 70 is set to "0", and the ID value of the IP address of a LAN client is set to "1".

FIG. 15 shows an example of the L3 table.

The L3 table is used in setting information of a layer 3 level, i.e. a destination IP address and a source IP address. Address setting is performed by utilizing ID values stored in the IP address registration table.

By looking up the L3 table, a packet which meets conditions set in the table is permitted to pass or discarded, depending on a setting in the "passage/non-passage" field. Further, a packet which does not agree with the conditions set in the table is discarded when the present mode is set to the unidentified packet discarding mode, and otherwise, it is permitted to pass. It should be noted that each entry number in the table is used as an ID value in the L4 table, described hereinbelow.

Now, the contents set in the FIG. 15 table are explained in detail. For example, an item having a connection number (entry number) of "0" defines that a packet directed from an arbitrary source IP address to a destination IP address whose ID value is "0", i.e. in the illustrated example, the IP address of the public server in the DMZ, is permitted to pass. It should be noted that when the value of information in a valid/invalid field is set to "1", information set in a corresponding IP address field is valid, whereas when the value of information in the valid/invalid field is set to "0", information set in the corresponding IP address field is invalid.

FIG. 16 shows the L4 table. In the table, there are registered destination port numbers and source port numbers for the TCP or UDP header. Further, it is possible to register an IP address combination set in the L3 table, as an ID value. Moreover, as far as a TCP protocol packet is concerned, it is possible to set a control flag in the table.

By looking up the table, a data packet which meets conditions set in the table is permitted to pass or discarded, depending on a setting in the "passage/non-passage" field. On the other hand, a packet which does not agree with the conditions set in the table is discarded when the present mode is set to the unidentified packet discarding mode, and otherwise, it is permitted to pass.

In an L3 number field is set an entry number of the above described L3 table.

In a TCP/UDP field is set a value indicative of whether the packet is a TCP packet or a UDP packet. A value of "1" set in this field is indicative of a TCP packet, while a value of "0" is indicative of a UDP packet.

In a source port number field is set a source port number.

In a destination port number field is set a destination port number.

In an ACK field is set a status of the ACK flag. When the ACK flag assumes "0", it is indicated that a corresponding packet is one requesting connection voluntarily.

In a valid/invalid setting field group is set information indicative of whether or not information stored in each of the above-mentioned field is valid. When the value of information in a valid/invalid setting field is set to "1", it is indicated that information in the corresponding field is valid, whereas the value of information is set to "0", it is indicated that information in the corresponding field is invalid.

In a WAN input field, a value of "1" is set when a packet inputted from the WAN 80 is to be filtered, and otherwise, a value of "0" is set.

In a passage/non-passage field, a value of "1" is set when a packet is permitted to pass, whereas when a packet is to be discarded, a value of "0" is set.

Next, the operation of the system according to the above embodiment will be described.

(1) Access from the WAN 80 to the Public Server 70 Set in the DMZ

Description will be given below of a data flow occurring when an external client accesses the public server 70 set in the DMZ from the WAN 80, so as to establish TCP connection by using a basic three-way handshake.

Figure 17:
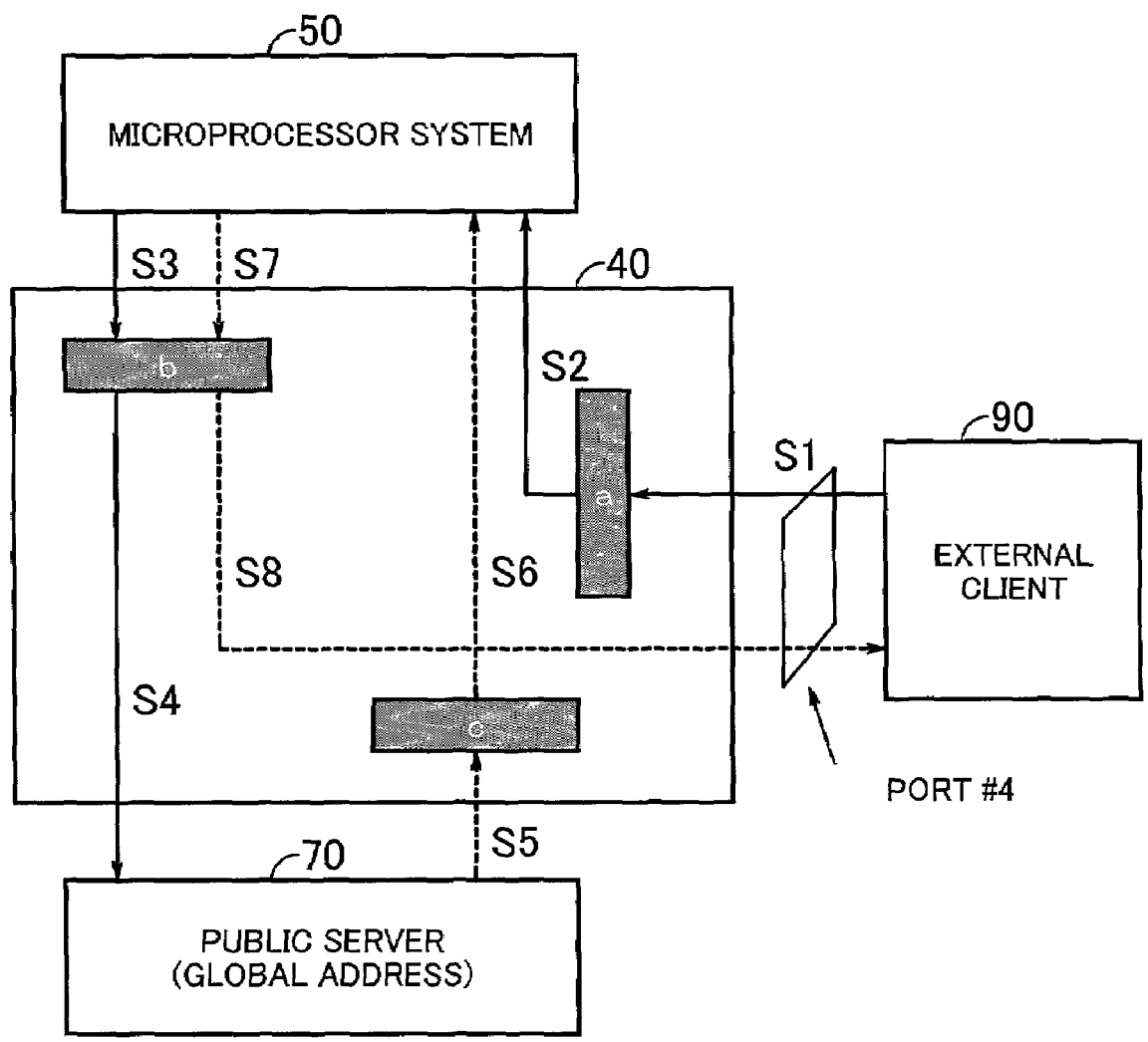
FIG. 17 is a diagram showing a data flow occurring when an external client connected to a WAN accesses a public server.

FIG. 17 shows a data flow when access is made to the public server 70 by an external client 90 connected to the WAN 80. In the present embodiment, it is assumed that a global address is assigned to the public server 70.

A data packet transmitted from the external client 90 to the public server 70 follows paths S1 to S4 indicated by solid lines in FIG. 17.

Figure 18:
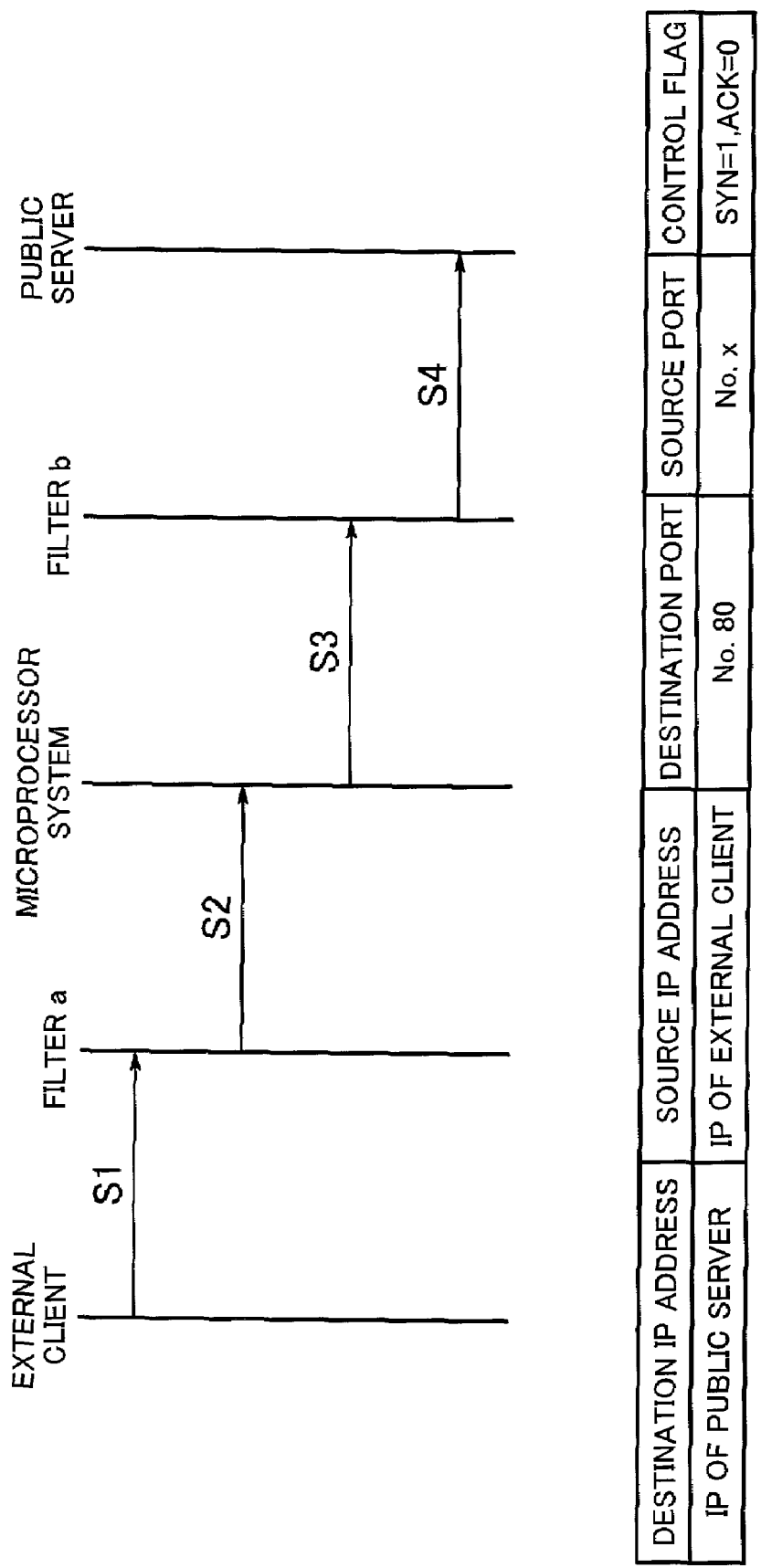
FIG. 18 is a diagram showing a data flow occurring when the external client accesses the public sever.

FIG. 18 shows the data flow for the access to the public server 70. As shown in FIG. 18, when the external client 90 accesses the public server 70, the destination IP address of the packet is set to the IP address of the public server 70, while the source IP address is set to the IP address of the external client 90. Further, the destination port is set to a port "No. 80", and the source port is set to a predetermined value. A control flag SYN is set to "1", and the ACK flag to "0".

First, the packet set as above is inputted via a physical port No. 4, i.e. the port #4, and delivered to the microprocessor system 50 via a filter a.

Referring again to FIG. 5, first, the packet inputted from the MAC block 45 is supplied to the queuing device 49 by way of the filter a implemented by the MAC address table look-up device 47 and the filtering device 48.

The packet addressed to the public server 70 is stored in a link buffer of the queuing device 49 corresponding to the interface block 46, and then delivered to the microprocessor system 50 via the interface block 46.

The packet subjected to routing processing in the microprocessor system 50 passes through the interface block 46 again, and is delivered to the queuing device 49 by way of a filter b implemented by the MAC address table look-up device 47 and the filtering device 48.

Then, the packet is stored in a link buffer of the queuing device 49 corresponding to the public server 70, followed by being delivered to the public server 70 via the MAC block 44.

Figure 19:
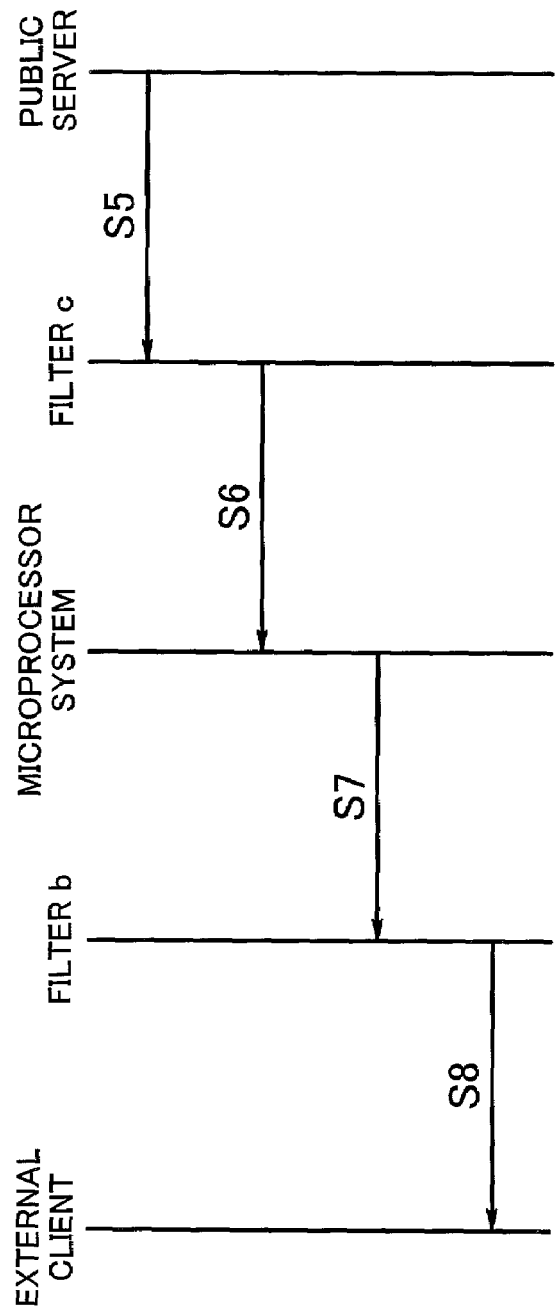
FIG. 19 is a diagram showing a data flow occurring when the public sever accesses the external client.

Then, as shown in FIG. 19, the public server 70 transmits a packet to the external client 90 on the requesting side. In the packet, the destination IP address is set to the IP address of the external client 90, while the source IP address is set to the IP address of the public server 70. Further, the destination port is set to a predetermined value, and the source port is set to the port "No. 80". The control flag SYN is set to "1", and the ACK flag to "1".

As shown in FIG. 17, the packet set as above is delivered to the external client 90, following paths indicated by broken lines in FIG. 17.

More specifically, referring again to FIG. 5, the packet inputted from the MAC block 44 to which is connected the public server 70 is supplied to the queuing device 49 by way of a filter c implemented by the MAC address table look-up device 47 and the filtering device 48, and stored in a link buffer of the queuing device 49 corresponding to the microprocessor system 50.

Then, the packet outputted from the queuing device 49 is supplied via the interface block 46 to the microprocessor system 50 and subjected to predetermined processing. Thereafter, the packet passes through the interface block 46 again, and is delivered to the queuing device 49 by way of the filter b implemented by the MAC address table look-up device 47 and the filtering device 48, to be stored in a link buffer of the queuing device 49 corresponding to the external client 90.

Then, the packet outputted from the queuing device 49 is delivered to the external client 90 via the MAC block 45.

Figure 20:
FIG. 20 is a diagram showing a data flow occurring when the external client accesses the public sever.

In communication processing which is executed therefor, a packet formed as shown in FIG. 20 is transmitted from the external client 90. More specifically, in this packet, the destination IP address is set to the IP address of the public server 70, while the source IP address is set to the IP address of the external client 90. Further, the destination port of the packet is set to the port "No. 80", and the source port is set to the predetermined value. The control flag SYN is set to "0", and the ACK flag to "1".

Figure 21:
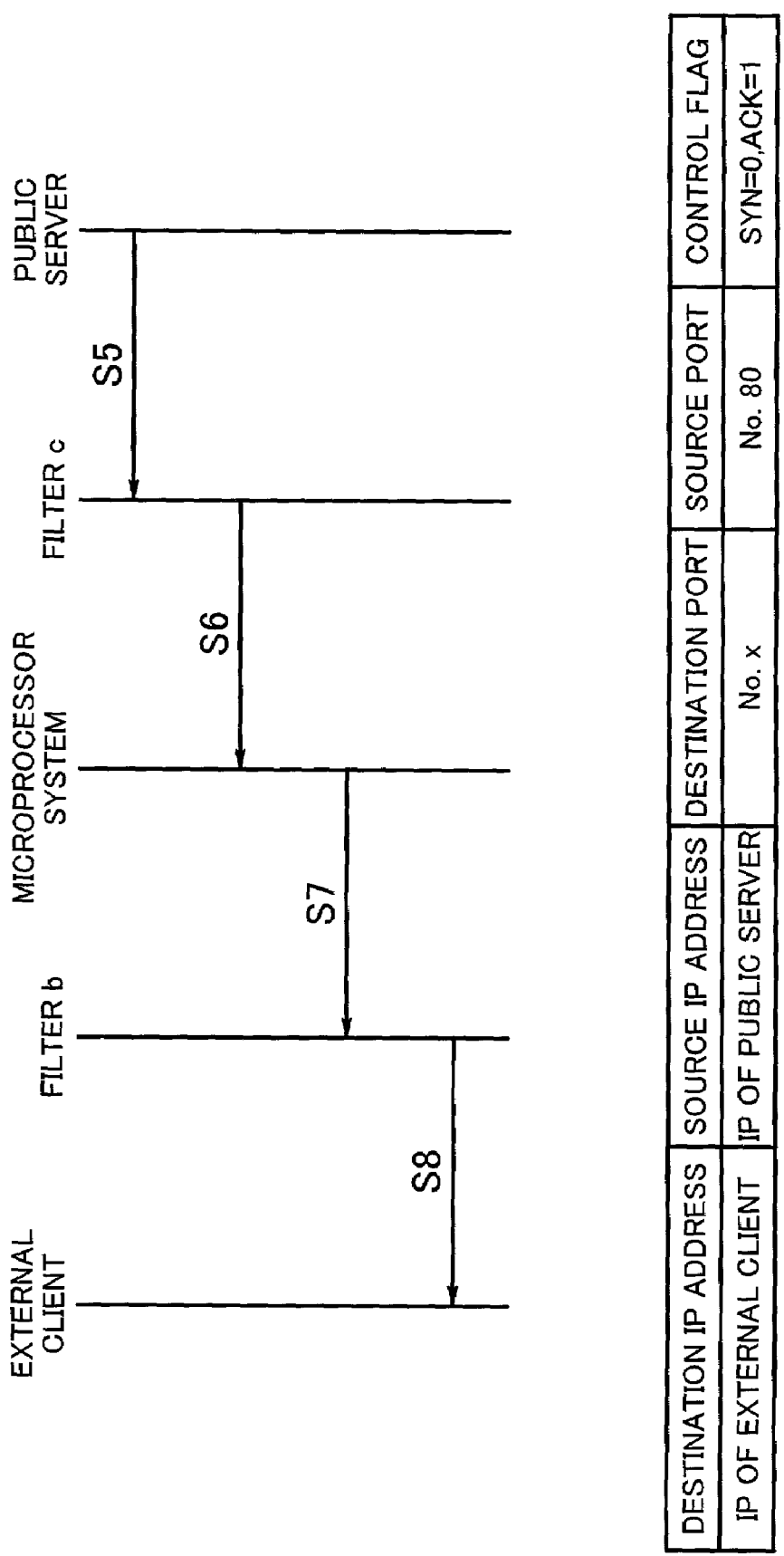
FIG. 21 is a diagram showing a data flow occurring when the public sever accesses the external client.

On the other hand, a packet set as shown in FIG. 21 is transmitted from the public server 70. More specifically, in the packet, the destination IP address is set to the IP address of the external client 90, while the source IP address is set to the IP address of the public server 70. Further, the destination port is set to the predetermined value, and the source port is set to the port "No. 80". The control flag SYN is set to "0", and the ACK flag to "1".

It should be noted that the entry 0 in FIG. 14, the entries 0, 1 in FIG. 15, and the entries 0, 1 in FIG. 16 represent examples of setting for filtering in the above operation. Further, if the operation mode is set to the mode for discarding unidentified packets, it is possible to inhibit access to ports other than the port of the TCP port number No. 80 (HTTP protocol) of the public WEB server.

(2) Access from the LAN to the Public Server 70 Installed in the DMZ

Description will be given below of a data flow occurring when an LAN client 100 on the LAN 60 accesses the public server 70 set in the DMZ, so as to establish TCP connection by using the basic three-way handshake.

Figure 22:
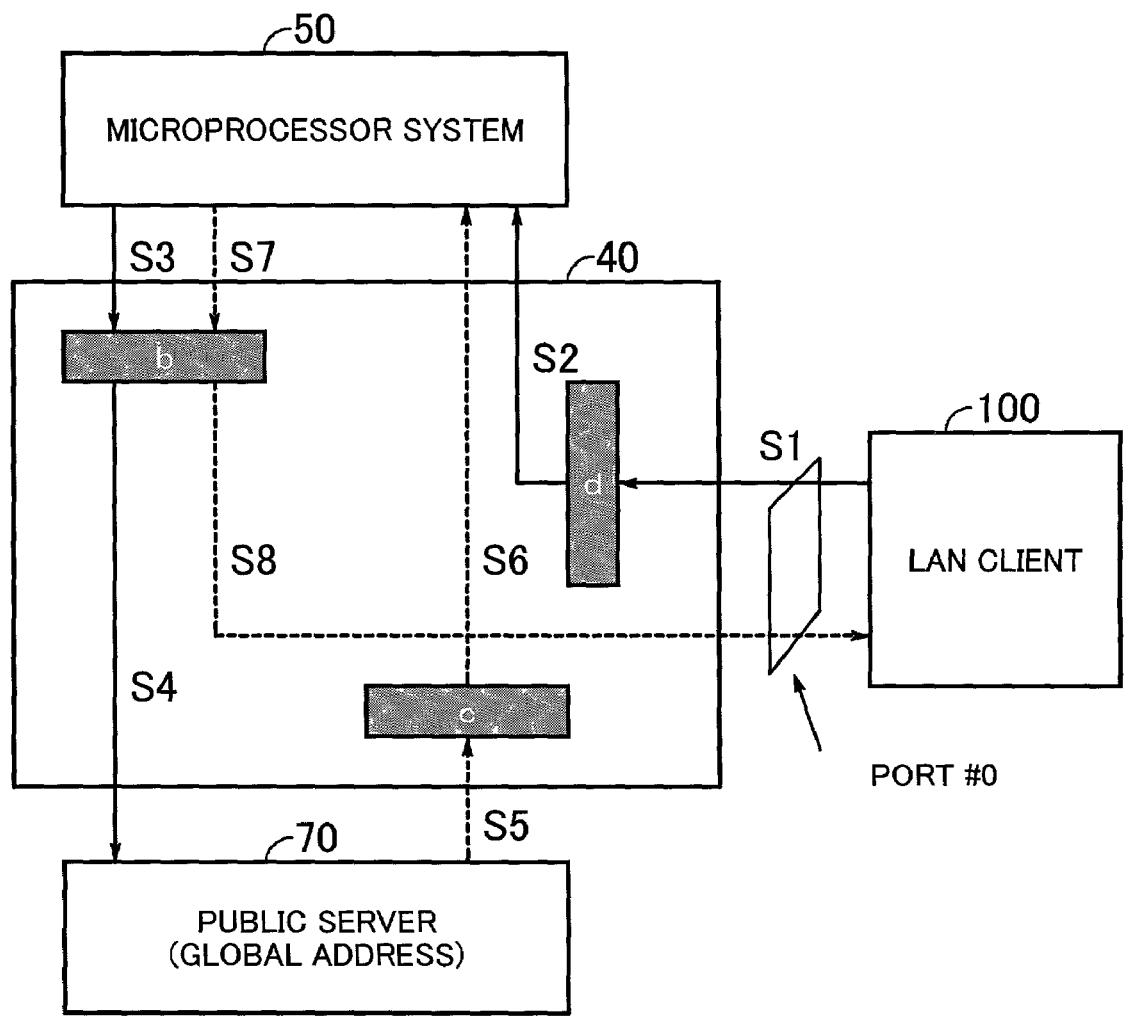
FIG. 22 is a diagram showing a data flow occurring when a LAN client connected to a LAN accesses the public server.

FIG. 22 shows a data flow for access to the public server 70 by the LAN client 100 connected to the LAN 60. In the present embodiment, it is assumed that a global address is assigned to the public server 70.

A packet transmitted from the LAN client 100 to the public server 70 follows paths S1 to S4 indicated by solid lines in the figure.

Figure 23:
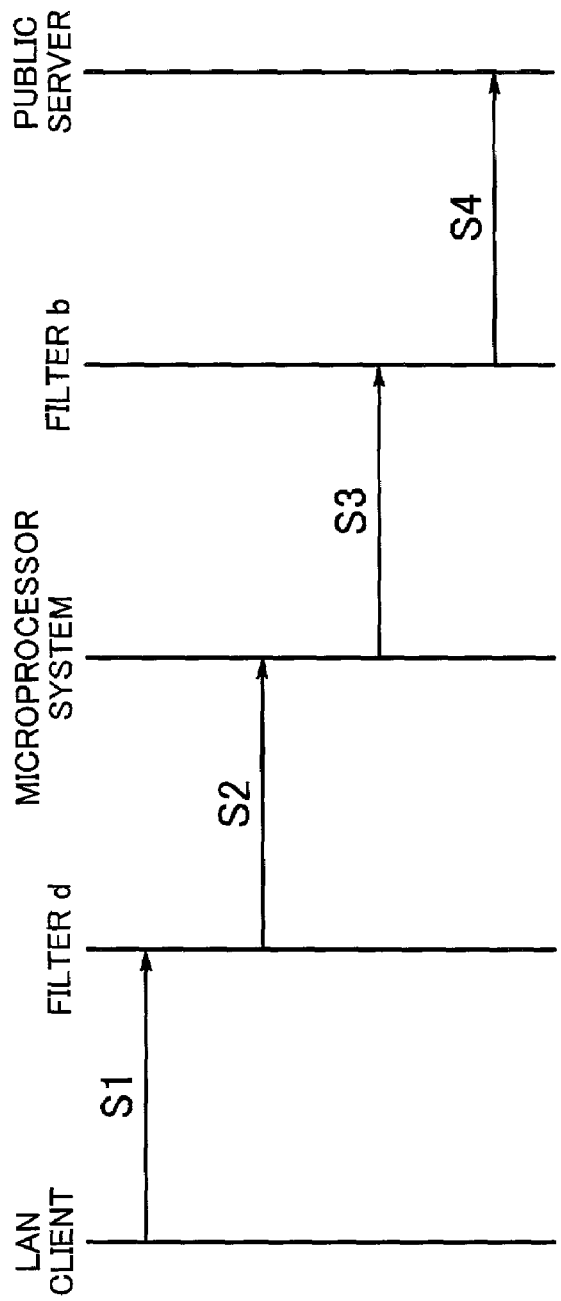
FIG. 23 is a diagram showing a data flow occurring when the LAN client accesses the public sever.

FIG. 23 shows the data flow for the access to the public server 70. As shown in FIG. 23, when the LAN client 100 accesses the public server 70, the destination IP address of the packet is set to the IP address of the public server 70, while the source IP address of the packet is set to the IP address of the LAN client 100. Further, the destination port is set to the port "No. 80", and the source port is set to a predetermined value. The control flag SYN is set to "1", and the ACK flag to "0".

First, the packet set as above is inputted via a physical port No. 0, i.e. the port #0, and delivered to the microprocessor system 50 via a filter d.

Referring again to FIG. 5, first, the packet inputted from the MAC block 41 is supplied to the queuing device 49 by way of the filter d implemented by the MAC address table look-up device 47 and the filtering device 48. Then, since the packet is addressed to the public server 70, it is stored in the link buffer of the queuing device 49 corresponding to the interface block 46, and then delivered to the microprocessor system 50 via the interface block 46.

The packet subjected to routing processing in the microprocessor system 50 passes through the interface block 46 again, and is delivered to the queuing device 49 by way of the filter b implemented by the MAC address table look-up device 47 and the filtering device 48.

Then, the packet is stored in the link buffer of the queuing device 49 corresponding to the public server 70, followed by being delivered to the public server 70 via the MAC block 44.

Figure 24:
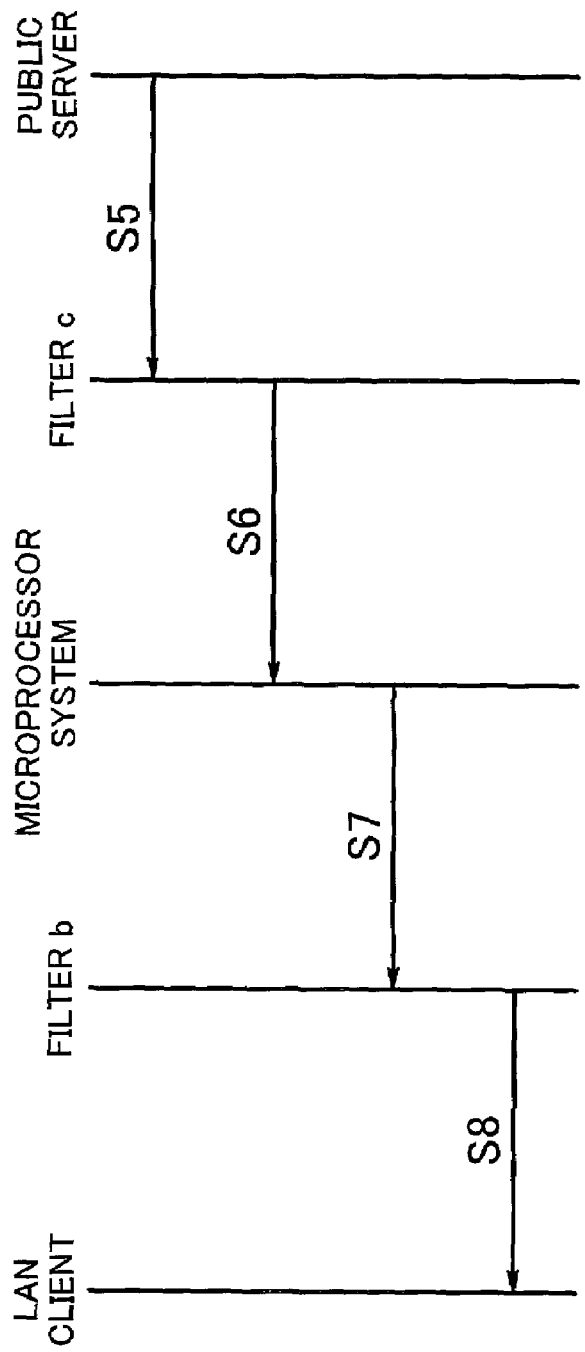
FIG. 24 is a diagram showing a data flow occurring when the public sever accesses the LAN client.

Next, as shown in FIG. 24, the public server 70 transmits a packet to the LAN client 100 on the requesting side.

In the packet, the destination IP address is set to the IP address of the LAN client 100, while the source IP address is set to the IP address of the public server 70. Further, the destination port is set to a predetermined value, and the source port is set to the port "No. 80". The control flag SYN is set to "1", and the ACK flag to "1".

As shown in FIG. 22, the packet formed as above is delivered to the LAN client 100, following paths S5 to S8 indicated by broken lines in the figure.

More specifically, referring again to FIG. 5, the packet inputted from the MAC block 44 to which is connected the public server 70 is supplied to the queuing device 49 by way of the filter c implemented by the MAC address table look-up device 47 and the filtering device 48, and stored in the link buffer of the queuing device 49 corresponding to the microprocessor system 50.

Then, the packet outputted from the queuing device 49 is supplied via the interface block 46 to the microprocessor system 50 and subjected to predetermined processing. Thereafter, the packet passes through the interface block 46 again, and is delivered to the queuing device 49 by way of the filter b implemented by the MAC address table look-up device 47 and the filtering device 48, to be stored in a link buffer of the queuing device 49 corresponding to the LAN client 100.

Then, the packet outputted from the queuing device 49 is delivered to the LAN client 100 via the MAC block 41.

Figure 25:
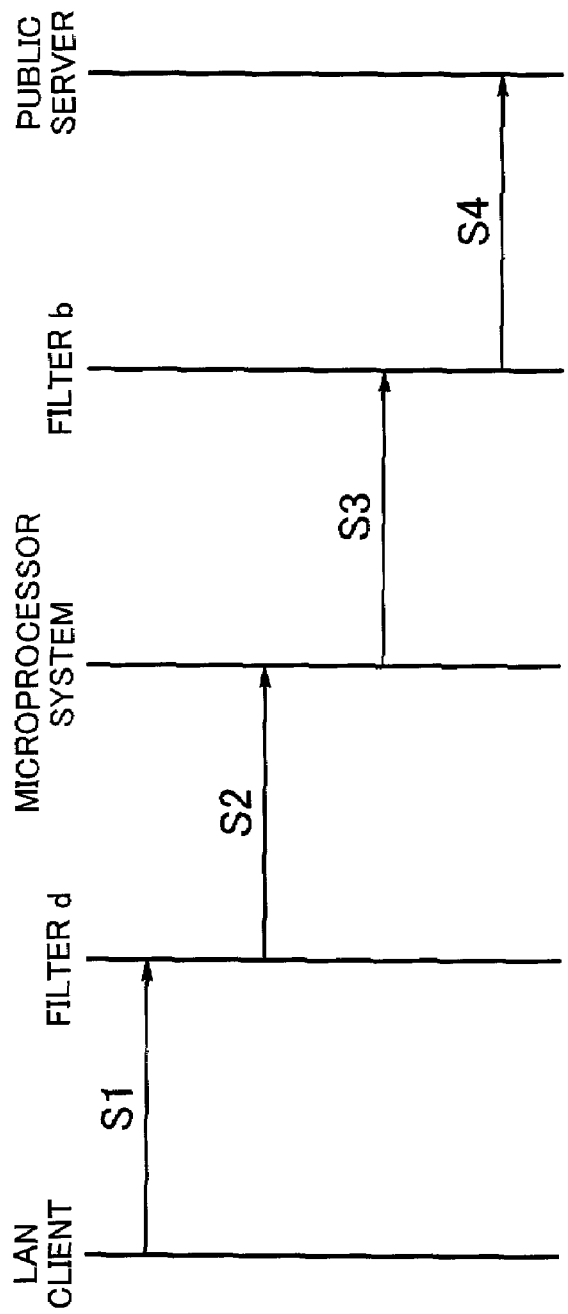
FIG. 25 is a diagram showing a data flow occurring when the LAN client accesses the public sever.

In communication processing which is executed thereafter, a packet set as shown in FIG. 25 is transmitted from the LAN client 100. More specifically, in the packet, the destination IP address is set to the IP address of the public server 70, while the source IP address is set to the IP address of the LAN client 100. Further, the destination port of the packet is set to the port "No. 80", and the source port is set to the predetermined value. The control flag SYN is set to "0", and the ACK flag to "1".

Figure 26:
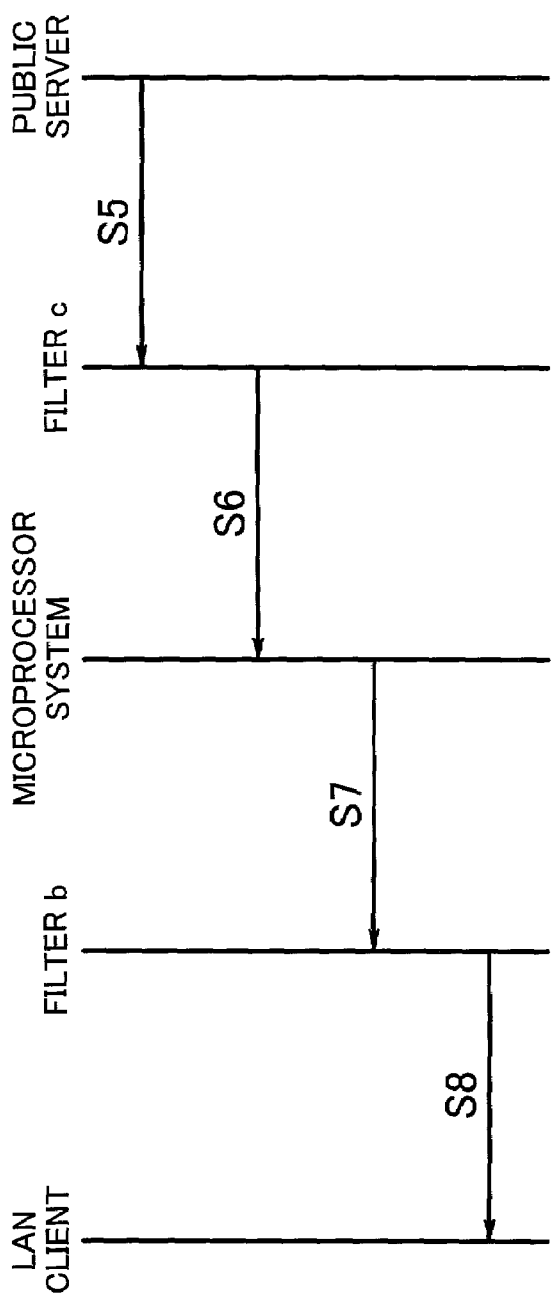
FIG. 26 is a diagram showing a data flow occurring when the public sever accesses the LAN client.

On the other hand, a packet formed as shown in FIG. 26 is transmitted from the public server 70 to the LAN client 100. More specifically, in this packet, the destination IP address is set to the IP address of the LAN client 100, while the source IP address is set to the IP address of the public server 70. Further, the destination port is set to the predetermined value, and the source port is set to the port "No. 80". The control flag SYN is set to "0", and the ACK flag to "1".

The entry 0 in FIG. 14, the entries 0, 1 in FIG. 15, and the entries 0, 1 in FIG. 16 show examples of setting for filtering in the above operation.

Further, the entry 1 in FIG. 14, the entry 2 in FIG. 15, and the entry 2 in FIG. 16 show examples of setting for blocking access to the LAN client 100 storing important databases even if the public server 70 happens to be taken over by an external malicious cracker.

(3) Data Transfer Between the LAN and the WAN

Description will be given below of a data flow occurring when a LAN client on the LAN 60 accesses a public server (e.g. an ISP server) on the WAN 80, so as to establish TCP connection by the basic three-way handshake.

Figure 27:
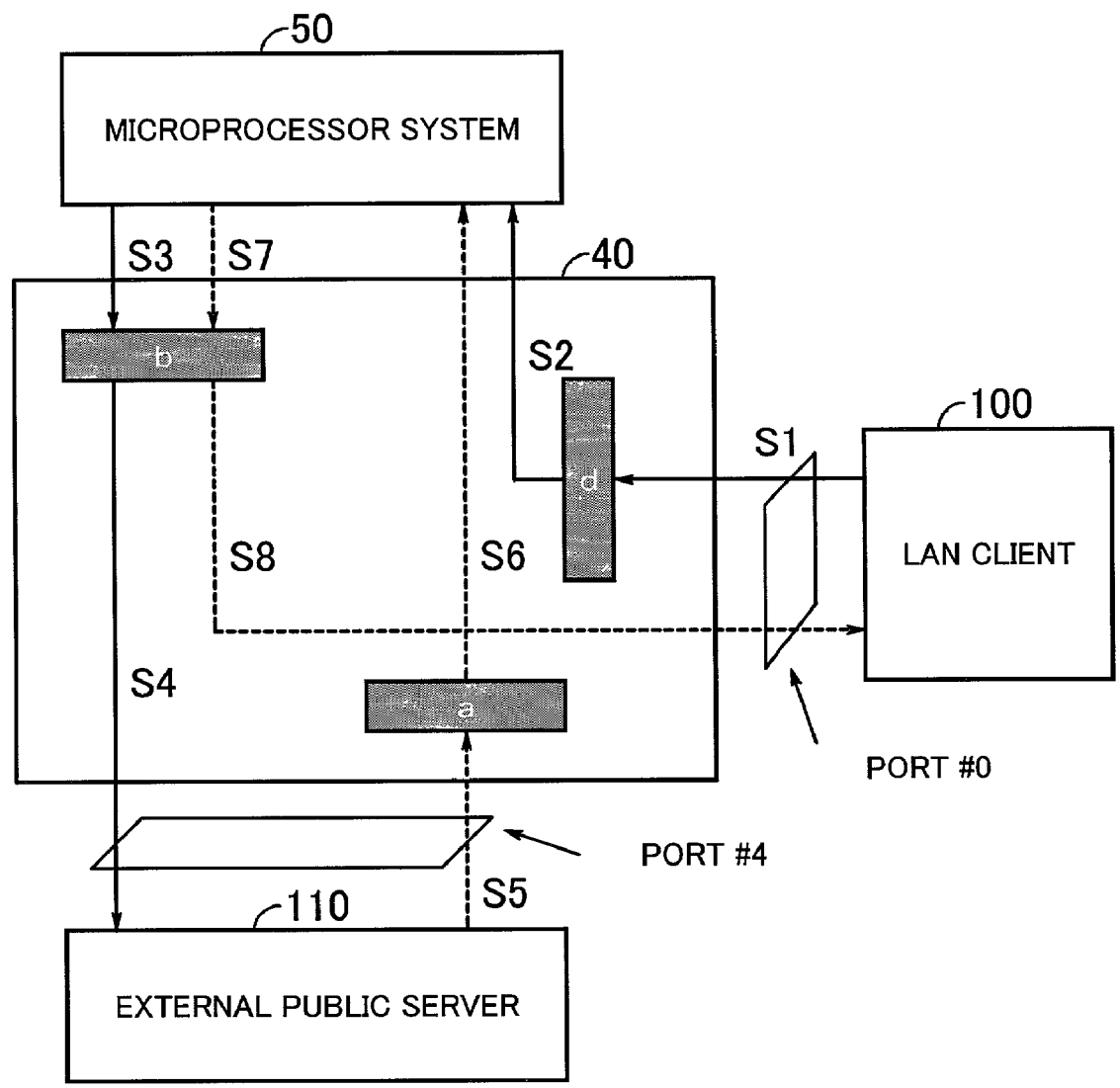
FIG. 27 is a diagram showing a data flow occurring when a LAN client connected to the LAN accesses an external public server.

FIG. 27 shows a data flow for access to the external public server 110 from the LAN client 100.

A data packet transmitted from the LAN client 100 to the external public server 110 follows paths S1 to S4 indicated by solid lines in FIG. 27.

Figure 28:
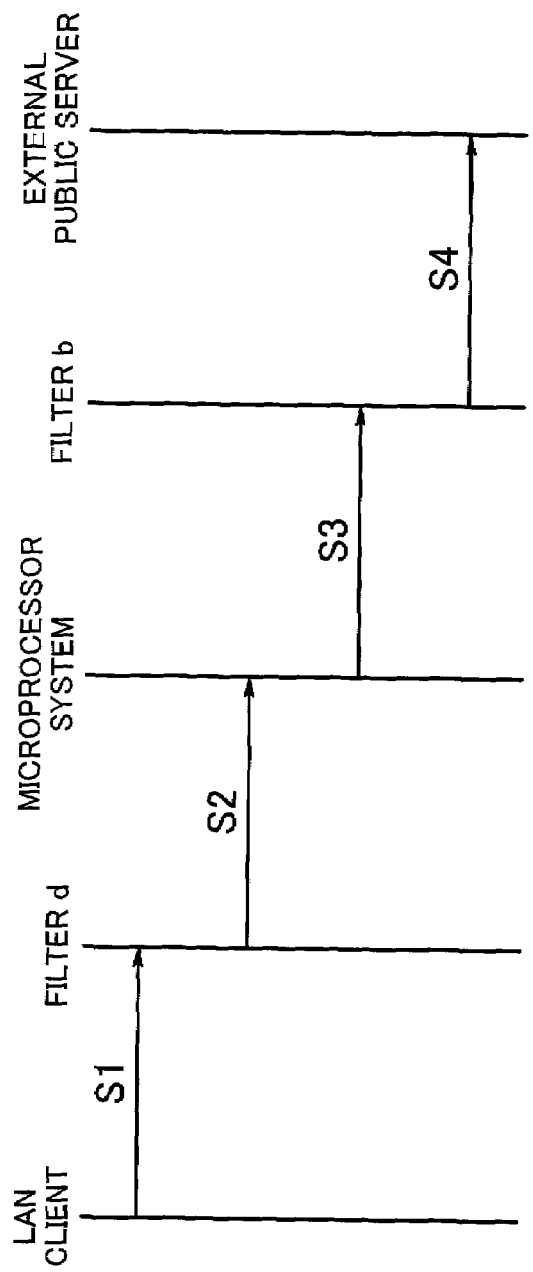
FIG. 28 is a diagram showing a data flow occurring when the LAN client accesses the external public sever.

FIG. 28 shows the data flow for the access to the external public server 110. As shown in FIG. 28, when the LAN client 100 accesses the external public server 110, the destination IP address of the packet is set to the IP address of the external public server 110, while the source IP address of the packet is set to the IP address of the LAN client 100. Further, the destination port is set to the port "No. 80", and the source port is set to a predetermined value. The control flag SYN is set to "1", and the ACK flag to "0".

First, the packet set as above is inputted via the physical port No. 0, i.e. the port #0, and delivered to the microprocessor system 50 via the filter d.

Referring again to FIG. 5, first, the packet inputted from the MAC block 41 is supplied to the queuing device 49 by way of the filter d implemented by the MAC address table look-up device 47 and the filtering device 48.

Then, since the packet is addressed to the external public server 110, it is stored in the link buffer of the queuing device 49 corresponding to the interface block 46, and then delivered to the microprocessor system 50 via the interface block 46.

The packet subjected to routing processing in the microprocessor system 50 passes through the interface block 46 again, and is delivered to the queuing device 49 by way of the filter b implemented by the MAC address table look-up device 47 and the filtering device 48.

Then, the packet is stored in a link buffer of the queuing device 49 corresponding to the external public server 110, followed by being delivered to the external public server 110 via the MAC block 45.

Figure 29:
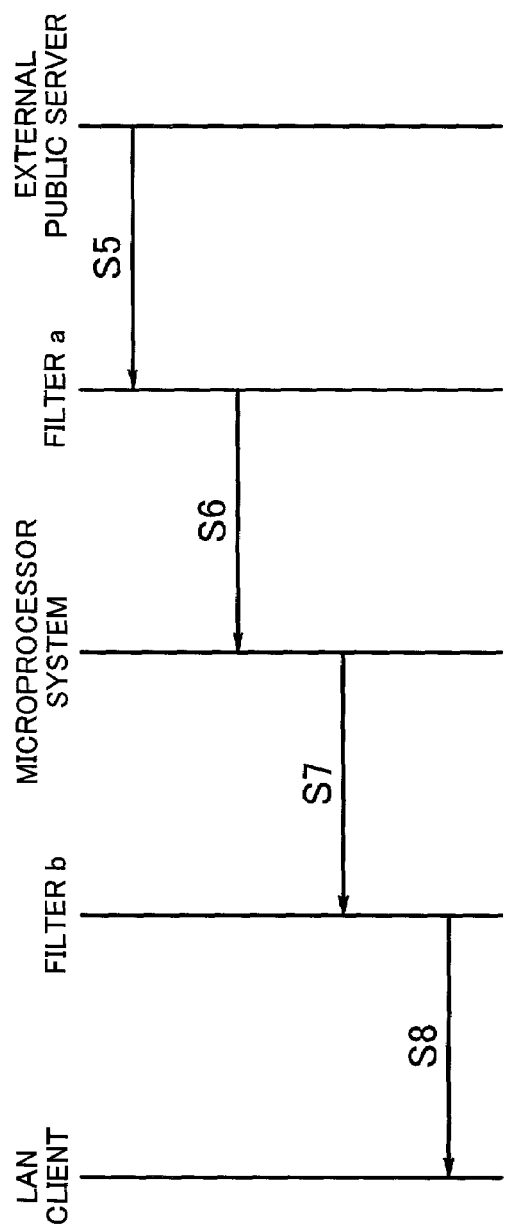
FIG. 29 is a diagram showing a data flow occurring when the external public sever accesses the LAN client.

Next, the external public server 110 transmits a packet shown in FIG. 29 to the LAN client 100 on the requesting side. More specifically, in the packet, the destination IP address is set to the IP address of the LAN client 100, while the source IP address is set to the IP address of the external public server 110. Further, the destination port is set to a predetermined value, and the source port is set to the port "No. 80". The control flag SYN is set to "1", and the ACK flag to "1".

As shown in FIG. 27, the packet set as above is delivered to the LAN client 100, following paths S5 to S8 indicated by broken lines in FIG. 27.

More specifically, referring again to FIG. 5, the packet inputted from the MAC block 45 to which is connected the external public server 110 is supplied to the queuing device 49 by way of the filter a implemented by the MAC address table look-up device 47 and the filtering device 48, and stored in the link buffer of the queuing device 49 corresponding to the microprocessor system 50.

Then, the packet outputted from the queuing device 49 is supplied to the microprocessor system 50 via the interface block 46 and subjected to predetermined processing. Thereafter, the packet passes through the interface block 46 again, and is delivered to the queuing device 49 by way of the filter b implemented by the MAC address table look-up device 47 and the filtering device 48, to be stored in the link buffer of the queuing device 49 corresponding to the LAN client 100.

Then, the packet outputted from the queuing device 49 is delivered to the LAN client 100 via the MAC block 41.

Figure 30:
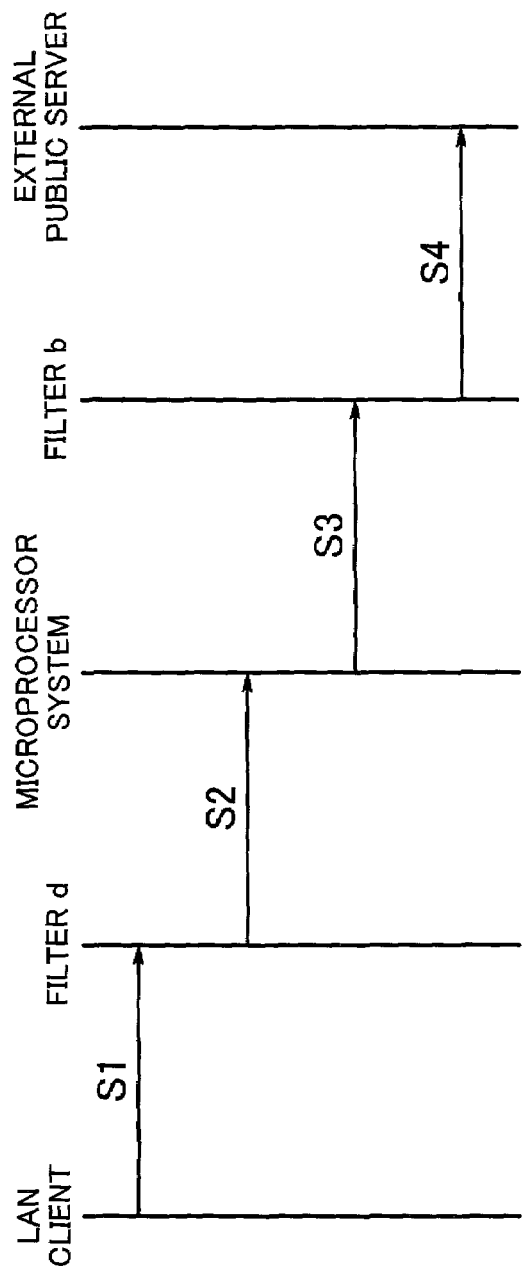
FIG. 30 is a diagram showing a data flow occurring when the LAN client accesses the external public sever.

In communication processing which is executed thereafter, a packet is transmitted from the LAN client 100 as shown in FIG. 30. More specifically, in the packet, the destination IP address is set to the IP address of the external public server 110, while the source IP address is set to the IP address of the LAN client 100. Further, the destination port of the packet is set to the port "No. 80", and the source port is set to the predetermined value. The control flag SYN is set to "0", and the ACK flag to "1".

Figure 31:
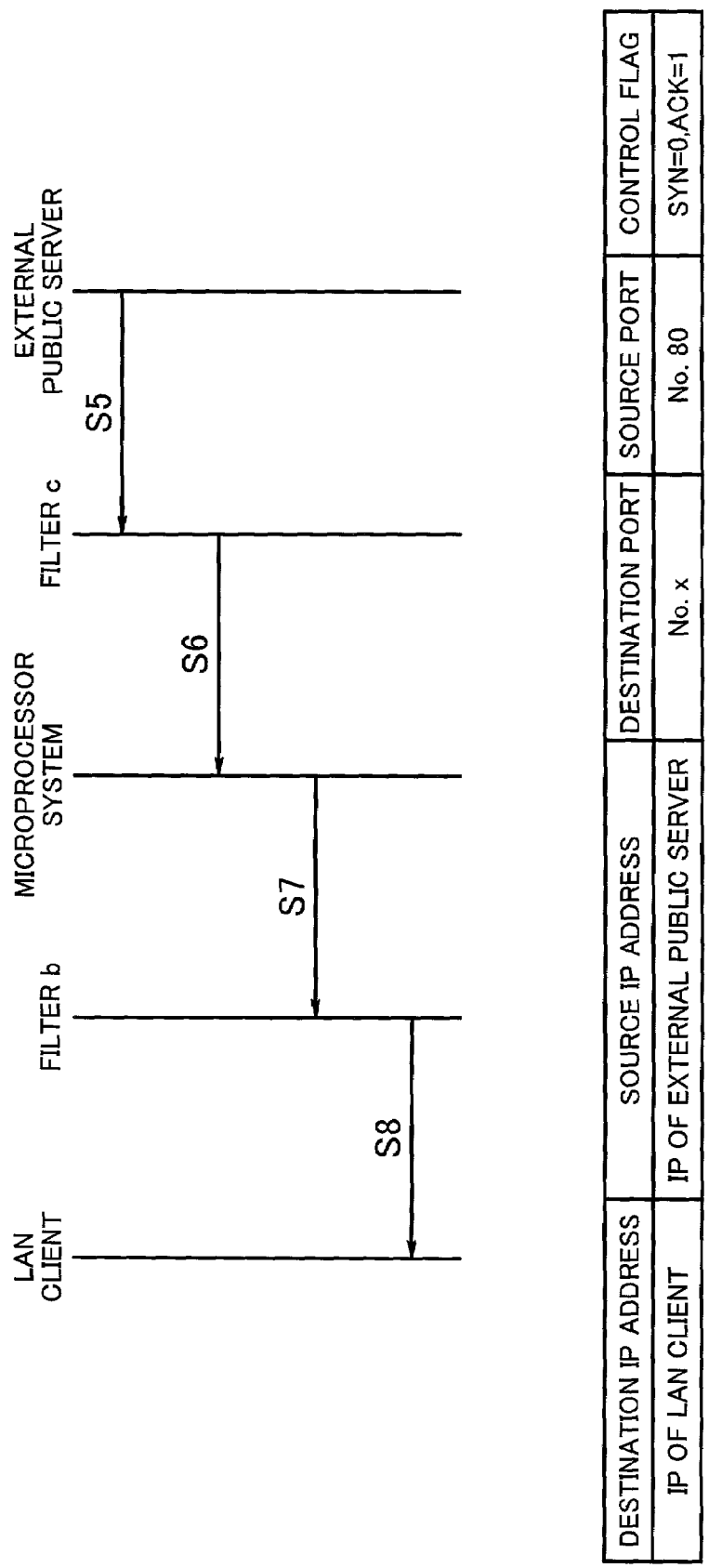
FIG. 31 is a diagram showing a data flow occurring when the external public sever accesses the LAN client.

On the other hand, a packet set as shown in FIG. 31 is transmitted from the external public server 110 to the LAN client 100. More specifically, in this packet, the destination IP address is set to the IP address of the LAN client 100, while the source IP address is set to the IP address of the external public server 110. Further, the destination port is set to the predetermined value, and the source port is set to the port "No. 80". The control flag SYN is set to "0", and the ACK flag to "1".

The entry 1 in FIG. 14, the entries 3, 4 in FIG. 15, and the entries 3, 4 in FIG. 16 show examples of setting for filtering in the above operation. Further, the entry 5 in FIG. 16 shows an example of setting for blocking invasion performed from the outside when ACK=0 holds, i.e. invasion from the outside with a voluntary connection request.

According to the above processing, since each of packets inputted via a plurality of ports is filtered by looking up information added to the packet, it is possible to realize a DMZ by simple construction of the system.

Further, when a connection request is transmitted from the WAN 80 to a predetermined node on the LAN 60, the packet for connection request is discarded, so that unauthenticated access from the outside to the LAN 60 can be blocked.

Moreover, when a connection request is made from the external server 110 to a predetermined node on the LAN 60, the packet of the connection request is discarded, so that even if the external public server 110 happens to be taken over as a beachhead for an attack to the node on the LAN 60, it is possible to protect the node from the attack.

Next, there is shown an example for realizing a flexible VPN (Virtual Private Network) according to the above embodiment.

The combination of the system of the embodiment and a conventional software package called the VPN package makes it possible to construct a flexible security system. The VPN software is typified by IPSec, and hence the following description is made based on IPSec.

Figure 32A:
Figure 32B:
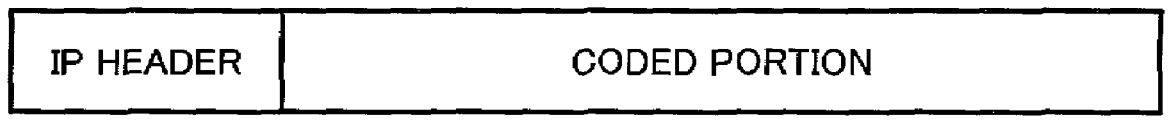

FIGS. 32(A) and 32(B) show distinction between an ordinary IP packet and a VPN packet. FIG. 32(A) illustrates the ordinary IP packet, while FIG. 32(B) illustrates the VPN packet. As is apparent from comparison between FIGS. 32(A) and 32(B), the VPN packet is encoded except for its IP header.

Figure 33:
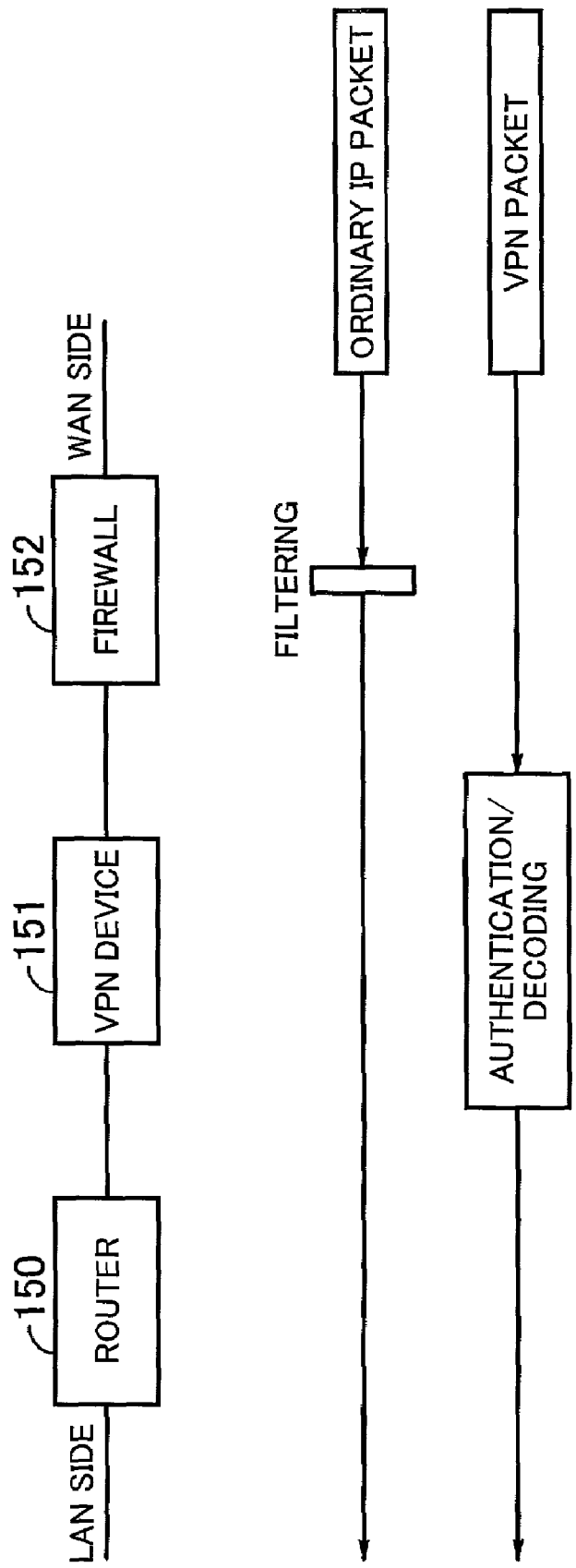
FIG. 33 is a diagram showing an example of the construction of a conventional VPN.

If a firewall 152 and a VPN device 151 are arranged as shown in FIG. 33, ordinary IP packets and VPN packets flow into the firewall 152. Each VPN packet has information of the layer 4 and higher layers (e.g. TCP/UDP number) encoded, and hence filtering of the packet, based on the information of the layer 4 higher layers, cannot be performed by the firewall 152.

The VPN device 151 captures a VPN packet and decodes the coded portion of the VPN packet, thereby converting the VPN packet to an ordinary IP packet. Then, the IP packet converted from the VPN packet is delivered to a router 150 within the system.

A problem with the system configured as above is that a data packet authenticated and decoded by the VPN device 151 is not filtered at all, which makes it impossible to carry out control based on the flexible security policy for protection of a LAN.

Figure 34:
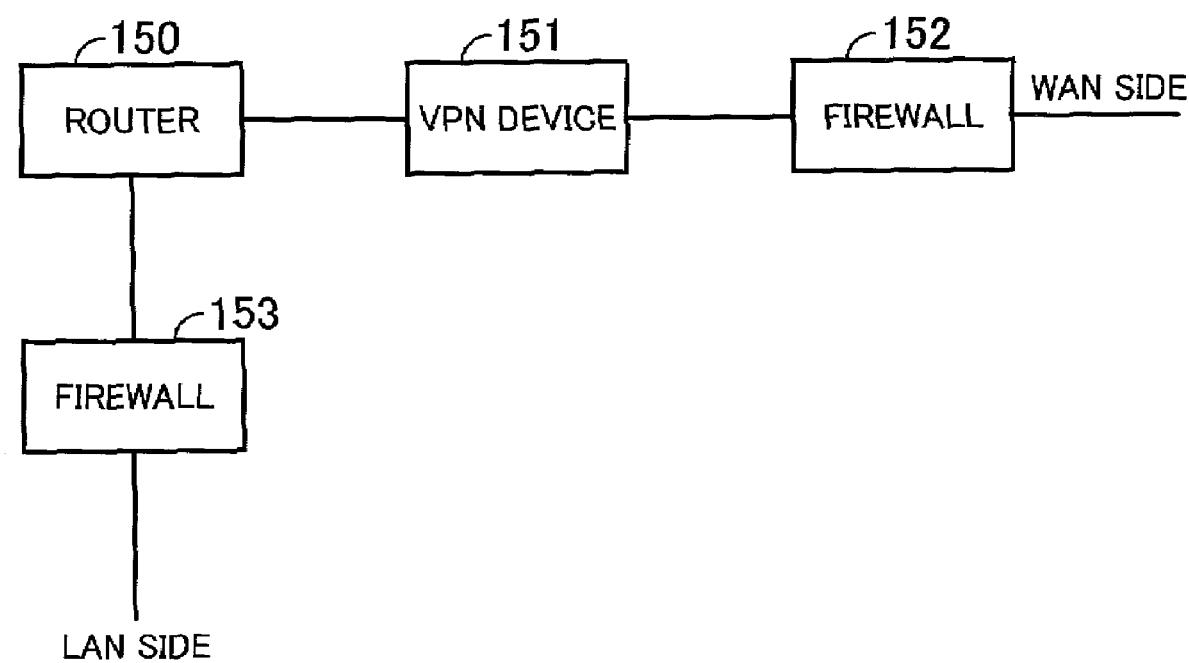
FIG. 34 is a diagram showing another example of the construction of the conventional VPN.

To overcome the above problem, a system configuration can be completed in which another firewall 153 is provided on a LAN side as shown in FIG. 34. However, this configuration requires a highly sophisticated technique and hence leads to an increase in manufacturing costs.

Utilization of the present embodiment makes it possible to solve the above problems and realize an inexpensive and compact VPN system.

Figure 35:
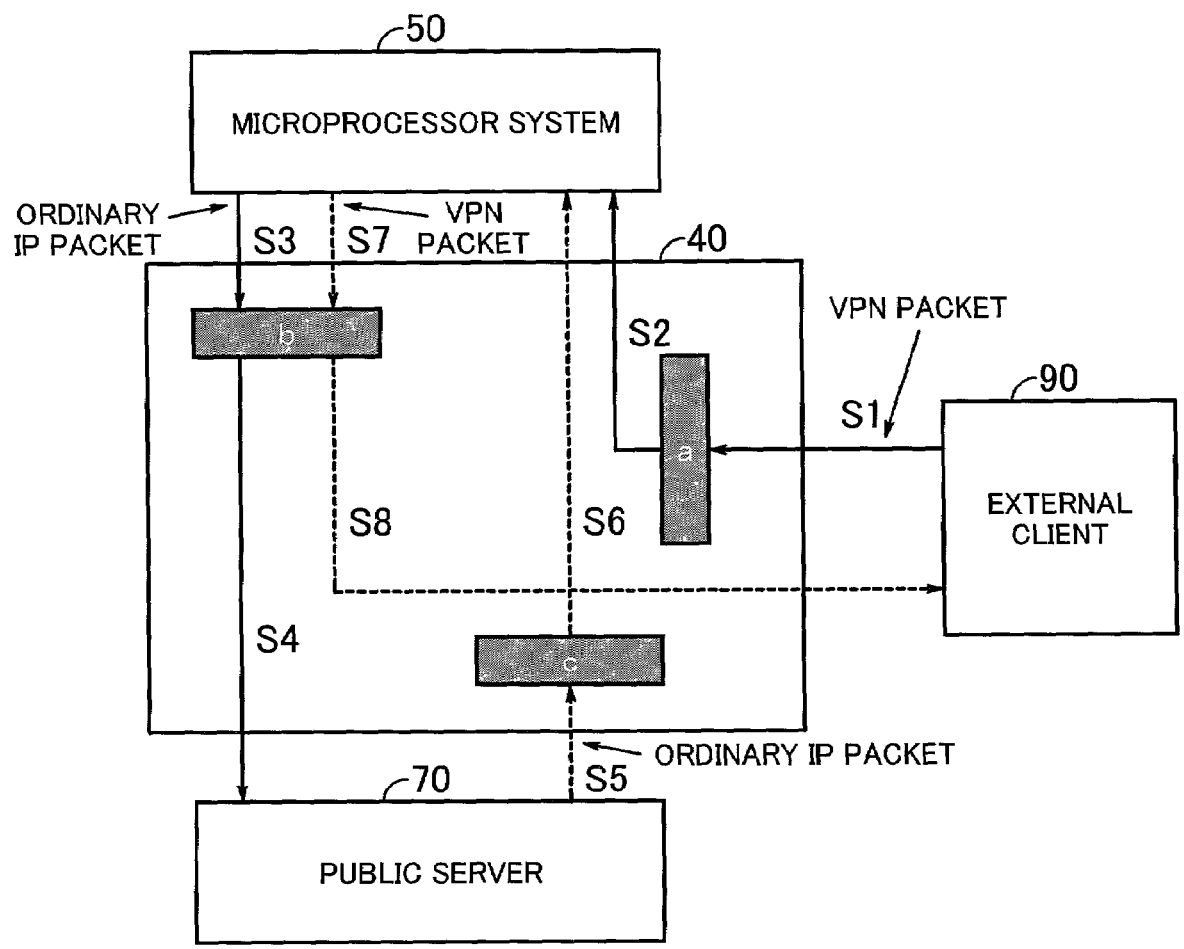
FIG. 35 is a diagram showing an example of the construction of a VPN to which is applied the present embodiment.
Figure 36:
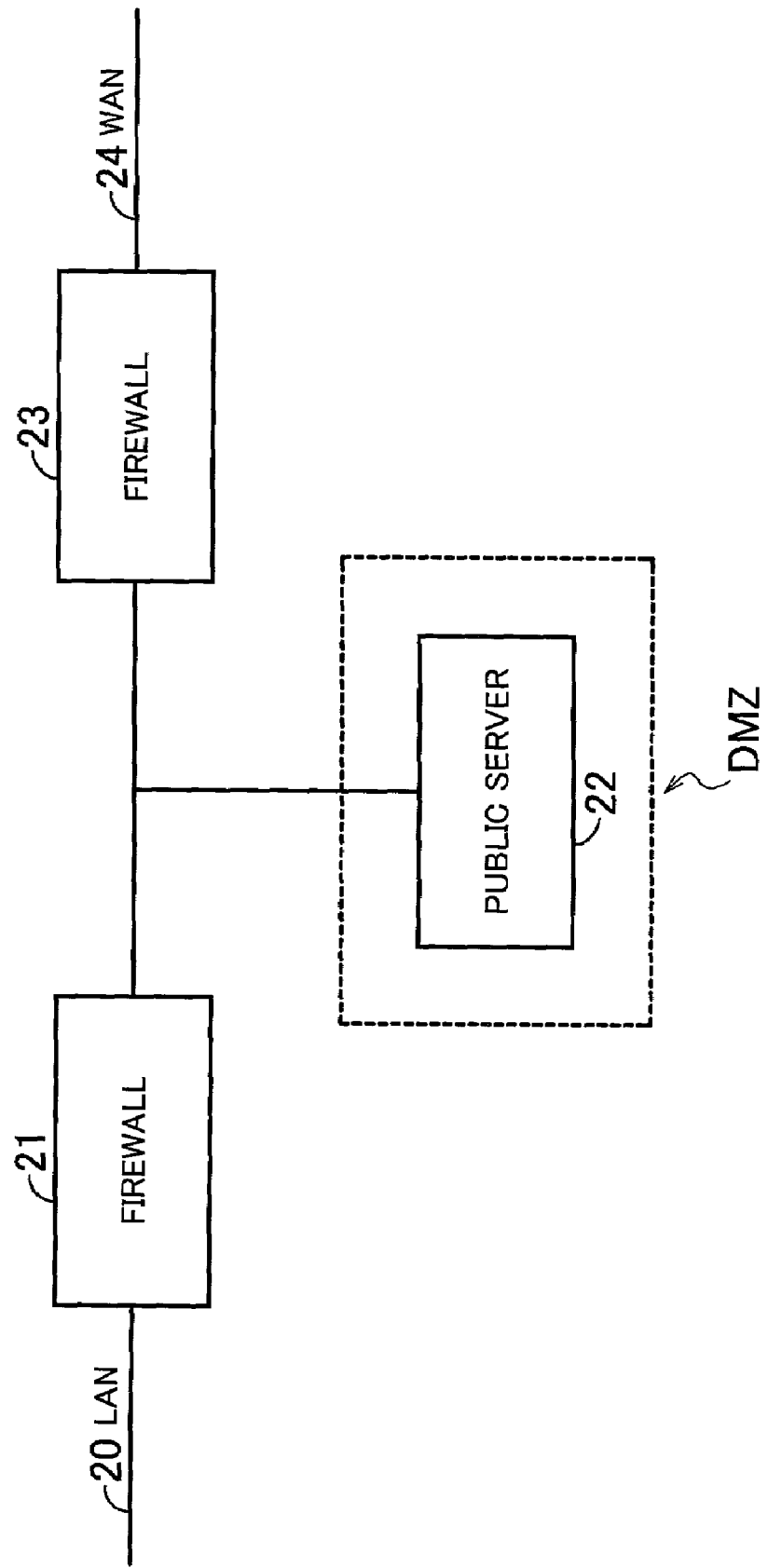
FIG. 36 is a diagram showing an example of a conventional DMZ.

More specifically, as shown in FIG. 35, software for implementing a VPN device is installed in a microprocessor system 50. FIG. 35 shows a process of filtering being carried out on a VPN packet transmitted to a public server 70 set in a DMZ.

The VPN packet having information of the layer 4 and higher layers encoded is transferred to the microprocessor system 50 without being subjected to the filtering processing based on the L4 table shown in FIG. 16 but based on the L3 table shown in FIG. 15. That is, the VPN packet passes through a filter a.

Then, the packet is authenticated and has a coded portion thereof decoded through processing by the microprocessor system 50, followed by being directed toward the public server 70. In this course, the packet is filtered by a filter b since the information of the layer 4 can be compared with the table this time.

More specifically, as set in the L4 table in FIG. 16, packets having TCP port numbers other than No. 80 are filtered off.

On the other hand, a packet transmitted from the public server 70 in the DMZ is filtered by a filter c and then encoded by the microprocessor system 50, followed by being transferred to the WAN 80 as a VPN packet.

According to the above example, it is possible to realize a VPN easily with a system having a simple construction.

It should be noted that the packet transfer device of the present embodiment, appearing in FIG. 2, can be formed on a semiconductor substrate and operated as a semiconductor device. Further, it is possible to form not only the packet transfer device 40 but also the microprocessor system 50 on an identical semiconductor substrate, thereby operating the two devices as a semiconductor device.

Although in the above embodiment, the LAN 60, the public server 70 and the WAN 80 are each connected to a single port, needless to say, it is possible to provide a plurality ports for connection with each of the LAN 60, the public server 70 and the WAN 80.

Further, although in the above embodiment, the present invention is implemented by hardware, it is possible to perform similar functions by software.

Moreover, the tables illustrated in FIGS. 6 and 11 to 16 are only provided by way of example, and hence the application of the present invention is not limited to the cases shown in the tables.

Further, in the above embodiment, it is possible to set the tables shown in FIGS. 6 and 11 to 16 such that the contents thereof can be written by an authorized users' client connected to the LAN 60. In this case, proper processing can be performed according to the use of the system.

Still further, although in the above embodiment, it is assumed that the tables shown in FIGS. 6 and 11 to 16 are not altered after initial setting, it is apparent that the contents of the tables may be changed, as required, depending on the status of the network. This method makes it possible to carry out optimal filtering in accordance with the incessantly changing status of the network.

As described above, according to the present invention, the packet transfer device for transferring packets includes the first port for connection to a LAN, the second port for connection to a public server, the third port for connection to a WAN, the filtering means for performing filtering processing according to attributes of each packet inputted via any one of the first to third ports, and the routing means for carrying out routing processing on the packet which was not discarded by the filtering means, and hence it is possible to construct a DMZ at a low cost.

Further, the semiconductor device included in the packet transfer device for transferring packets includes the first port for connection to a LAN, the second port for connection to a public server, the third port for connection to a WAN, the filtering means for performing filtering processing according to attributes of each packet inputted via any one of the first to third ports, and the routing means for carrying out routing processing on the packet which was not discarded by the filtering means, and hence it is possible to construct a DMZ at a low cost.

Moreover, in the packet transfer system including a LAN, a public server, a WAN, and the packet transfer device for transferring packets between the LAN, the public server, and the WAN, the packet transfer device includes the first port for connection to the LAN, the second port for connection to the public server, the third port for connection to the WAN, the filtering means for performing filtering processing according to attributes of each packet inputted via any one of the first to third ports, and the routing means for carrying out routing processing on the packet which was not discarded by the filtering means, and hence it is possible to reliably block unauthenticated access from the WAN even when the public server is installed.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A packet transfer device for transferring packets, comprising:
    a first port for connection to a LAN;
    a second port for connection to a public server;
    a third port for connection to a WAN;
    a filtering unit for performing filtering processing according to attributes of each packet inputted via any one of said first to third pods, said filtering unit including a round robin arbiter selecting a comparison request for each packet; and
    a routing unit for carrying out routing processing on the packet which was not discarded by said filtering unit.

2. The packet transfer device according to claim 1, including a filtering condition-setting unit for setting conditions for filtering by said filtering unit,
    wherein said filtering unit performs filtering with reference to the conditions set by said filtering condition-setting unit.

3. The packet transfer device according to claim 2, wherein said filtering unit discards the packet when the packet does not agree with any one of the conditions set by said filtering condition-setting unit.

4. The packet transfer device according to claim 2, wherein said filtering unit allows the packet to pass when the packet does not agree with any one of the conditions set by said filtering condition-setting unit.

5. The packet transfer device according to claim 1, wherein when the packet inputted via said third port is making a connection request to a node connected to said first port, said filtering unit discards the packet.

6. The packet transfer device according to claim 1, wherein when the packet inputted via said second port is making a connection request to a node connected to said first port, said filtering unit discards the packet.

7. The packet transfer device according to claim 1, further including a decoding unit for decoding the packet inputted via said third port and supplying the decoded packet to said second port, and
an encoding unit for encoding the packet inputted via said second port and supplying the encoded packet to said third port.

8. A semiconductor device included in a packet transfer device for transferring packets,
the semiconductor device comprising:
a first port for connection to a LAN;
a second port for connection to a public server;
a third port for connection to a WAN;
a filtering unit for performing filtering processing according to attributes of each packet inputted via any one of said first to third ports, said filtering unit including a round robin arbiter selecting a comparison request for each packet; and
a routing unit for carrying out routing processing on the packet which was not discarded by said filtering unit.

9. The semiconductor device according to claim 8, including a filtering condition-setting unit for setting conditions for filtering by said filtering unit,
wherein said filtering unit performs filtering with reference to the conditions set by said filtering condition-setting unit.

10. The semiconductor device according to claim 9, wherein said filtering unit discards the packet when the packet does not agree with any one of the conditions set by said filtering condition-setting unit.

11. The semiconductor device according to claim 9, wherein said filtering unit allows the packet to pass when the packet does not agree with any one of the conditions set by said filtering condition-setting unit.

12. The semiconductor device according to claim 8, wherein when the packet inputted via said third port is making a connection request to a node connected to said first port, said filtering unit discards said packet.

13. The semiconductor device according to claim 8, wherein when the packet inputted via said second port is making a connection request to a node connected to said first port, said filtering unit discards the packet.

14. The semiconductor device according to claim 8, further including a decoding unit for decoding the packet inputted via said third port and supplying the decoded packet to said second port, and
an encoding unit for encoding the packet inputted via said second port and supplying the encoded packet to said third port.

15. A packet transfer method in a system including a LAN, a public server, a WAN, and a packet transfer device for transferring packets between the LAN, the public server, and the WAN, comprising: connecting a first port to the LAN:
connecting a second port to the public server;
connecting a third port to the WAN;
performing filtering processing including selecting by a round robin arbiter comparison requests for each packet according to attributes of each packet inputted via any one of said first to third ports; and
routing the packet which was not discarded by said filtering unit.

16. The packet transfer method in the system according to claim 15, further comprising:
setting conditions for filtering, and
filtering with reference to the conditions set.

17. The packet transfer method in the system according to claim 16, wherein said filtering discards the packet when the packet does not agree with any one of the conditions set.

18. The packet transfer method in the system according to claim 16, wherein said filtering allows the packet to pass when the packet does not agree with any one of the conditions set.

19. The packet transfer method in the system according to claim 15, wherein when the packet inputted via said third port is making a connection request to a node connected to said first port, said filtering discards the packet.

20. The packet transfer method in the system according to claim 15, wherein when the packet inputted via said second port is making a connection request to a node connected to said first port, said filtering discards said packet.

21. The packet transfer method in the system according to claim 15, further comprising:
decoding the packet inputted via said third port and supplying the decoded packet to said second port, and
encoding the packet inputted via said second port and supplying the encoded packet to said third port.

22. A packet transfer system including a LAN, a public server, a WAN, and a packet transfer device for transferring packets between the LAN, the public server, and the WAN,
the packet transfer device comprising:
a first port for connection to the LAN;
a second port for connection to the public server;
a third port for connection to the WAN;
a filtering unit for performing filtering processing according to attributes of each packet inputted via any one of said first to third ports, said filtering unit including a round robin arbiter selecting a comparison request for each packet; and
a routing unit for carrying out routing processing on the packet which was not discarded by said filtering unit.

* * * * *

UNITED STATES PATENT AND TRADEMARK OFFICE
CERTIFICATE OF CORRECTION

PATENT NO. : 7,471,690 B2  Page 1 of 1
APPLICATION NO. : 09/962118
DATED : December 30, 2008
INVENTOR(S) : Kazuya Asano et al.

It is certified that error appears in the above-identified patent and that said Letters Patent is hereby corrected as shown below:

Claim 1, Col. 18, line 41, delete "pods" and insert --ports--
Claim 15, Col. 20, line 2, delete "LAN:" and insert --LAN;--

Signed and Sealed this

Twenty-fourth Day of March, 2009

JOHN DOLL
*Acting Director of the United States Patent and Trademark Office*